(12) United States Patent
Kumahara et al.

(10) Patent No.: US 9,958,968 B2
(45) Date of Patent: May 1, 2018

(54) INPUT AND OUTPUT OPERATION DEVICE

(71) Applicant: Panasonic Intellectual Property Management Co., Ltd., Osaka (JP)

(72) Inventors: Minoru Kumahara, Osaka (JP); Takuya Mori, Mie (JP); Teruyuki Takizawa, Osaka (JP); Takeshi Nakazawa, Hyogo (JP); Jiro Seki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 30 days.

(21) Appl. No.: 15/102,906

(22) PCT Filed: Dec. 11, 2014

(86) PCT No.: PCT/JP2014/006178
§ 371 (c)(1),
(2) Date: Jun. 9, 2016

(87) PCT Pub. No.: WO2015/087550
PCT Pub. Date: Jun. 18, 2015

(65) Prior Publication Data
US 2016/0357272 A1 Dec. 8, 2016

(30) Foreign Application Priority Data

Dec. 12, 2013 (JP) .................................. 2013-257288
May 9, 2014 (JP) .................................. 2014-097674

(51) Int. Cl.
*G06F 3/033* (2013.01)
*G09G 5/08* (2006.01)
(Continued)

(52) U.S. Cl.
CPC .............. *G06F 3/038* (2013.01); *G06F 3/016* (2013.01); *G06F 3/0338* (2013.01);
(Continued)

(58) Field of Classification Search
CPC .......... G06F 3/016; G06F 3/011; G06F 3/0346
See application file for complete search history.

(56) References Cited

U.S. PATENT DOCUMENTS

| 2005/0259075 A1 | 11/2005 | Ishikawa et al. |
| 2015/0117679 A1* | 4/2015 | Wang ................. H04R 1/02 |
| | | 381/162 |

(Continued)

FOREIGN PATENT DOCUMENTS

| JP | 58-172739 A | 10/1983 |
| JP | 05-057645 A | 3/1993 |
| JP | 2006-178862 A | 7/2006 |

OTHER PUBLICATIONS

International Search Report for corresponding International Application No. PCT/JP2014/006178 dated Feb. 17, 2015.

*Primary Examiner* — Nan-Ying Yang
(74) *Attorney, Agent, or Firm* — Renner, Otto, Boisselle & Sklar, LLP

(57) ABSTRACT

An input and output operation device includes an actuator 165 including an operation unit 850; a movable unit having the operation unit and at least one attraction magnet mounted thereon and including a concaved portion in a part thereof; a secured unit including a convexed spherical surface loosely engageable with at least one magnetic member and the concaved portion of the movable unit, the convexed spherical surface being point-contactable or line-contactable with the concaved portion of the movable unit by a magnetic attraction force, the secured unit supporting the movable unit such that the movable unit is freely rotatable as centered around a spherical center of the convexed spherical surface; a first driving unit rotating the operation unit as centered around an X-axis passing the spherical center; a second driving unit rotating the operation unit as centered around a Y-axis perpendicular to the X-axis;

(Continued)

a third driving unit rotating the movable unit as centered around a Z-axis that is perpendicular to the X-axis and the Y-axis and is a central axis of the operation unit; and a detector detecting a first rotation angle and a second rotation angle of the operation unit around the X-axis and the Y-axis; and also includes a detection circuit unit 360 generating first and second rotation angle signals; a control computation processing unit 94 generating first and second target rotation angle signals; and a driving circuit unit 350 generating a signal usable to drive the first and second driving units.

20 Claims, 29 Drawing Sheets

(51) Int. Cl.
*G06F 3/038* (2013.01)
*G06F 3/0338* (2013.01)
*G06F 3/01* (2006.01)
*G06F 3/0354* (2013.01)
*H01H 50/36* (2006.01)
*H01H 50/44* (2006.01)
*H01H 50/64* (2006.01)

(52) U.S. Cl.
CPC ........ *G06F 3/0383* (2013.01); *G06F 3/03549* (2013.01); *H01H 50/36* (2013.01); *H01H 50/44* (2013.01); *H01H 50/643* (2013.01)

(56) References Cited

U.S. PATENT DOCUMENTS

| | | | |
|---|---|---|---|
| 2015/0253908 A1* | 9/2015 | Go | G06F 3/046 345/173 |
| 2016/0018843 A1* | 1/2016 | Lopez | G05G 5/03 74/471 XY |

* cited by examiner

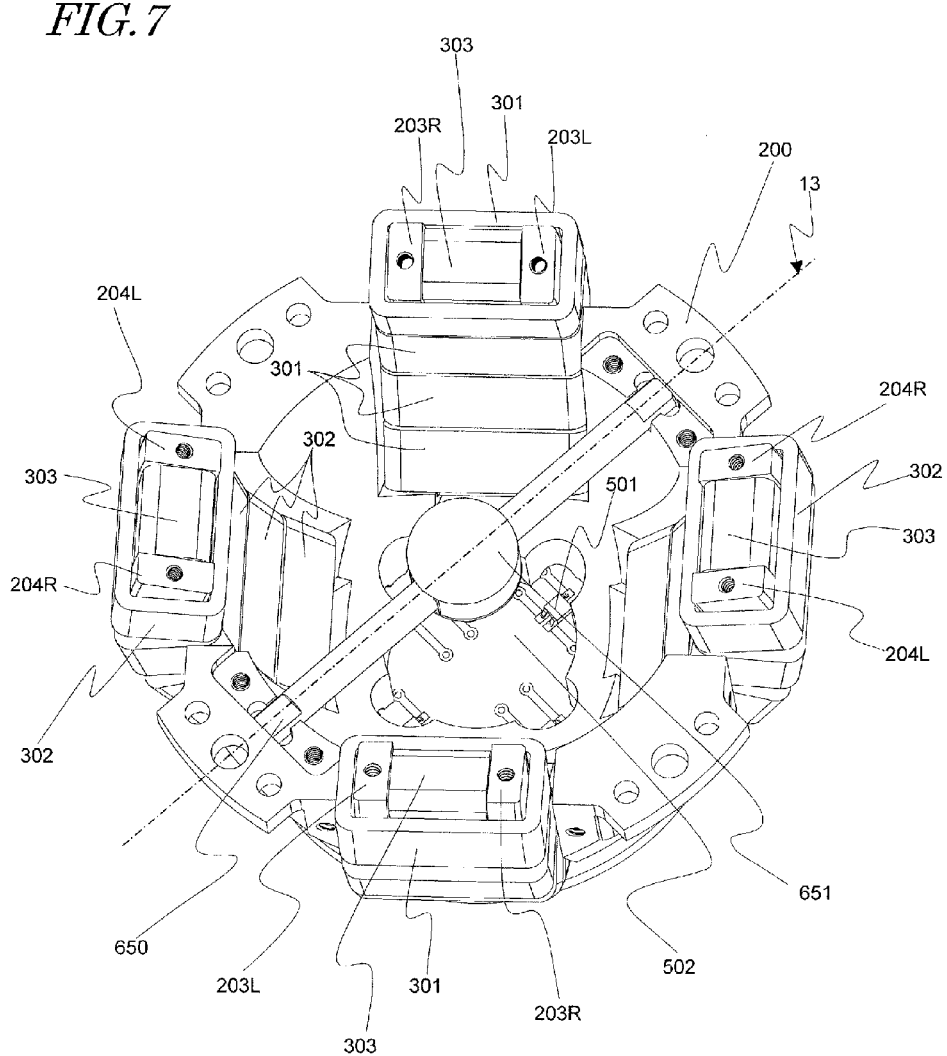

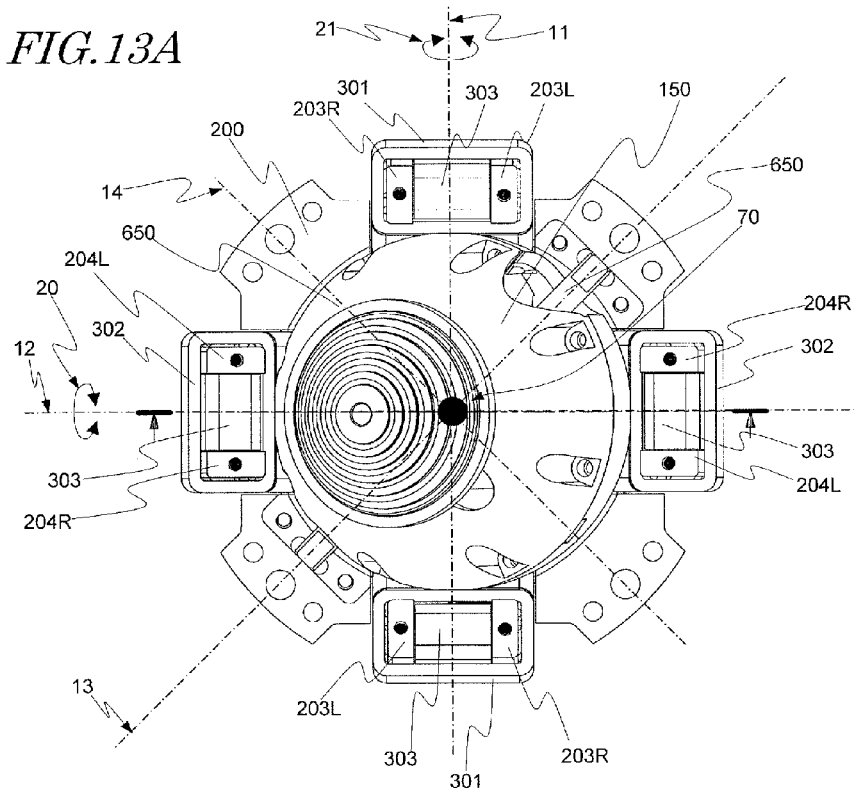
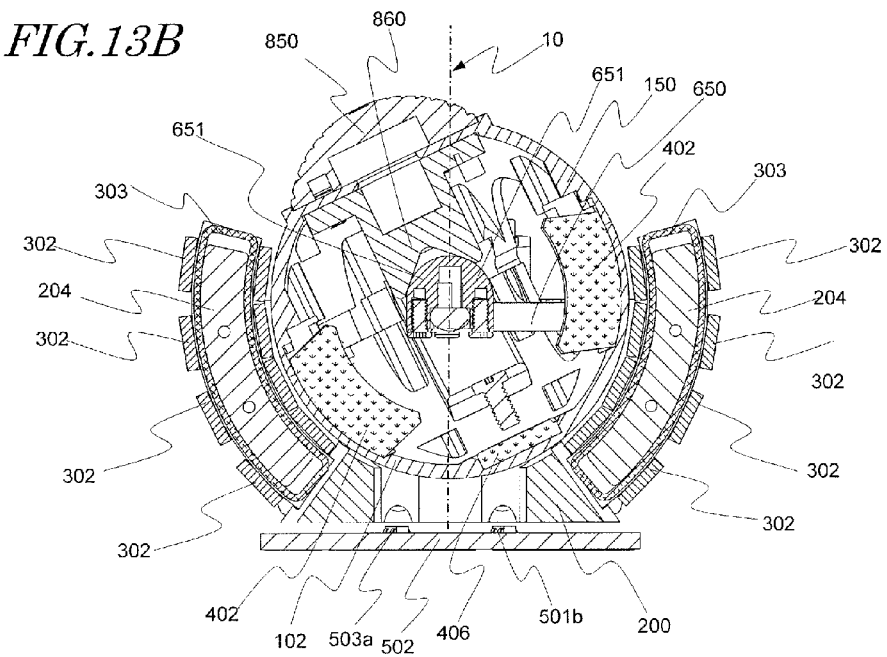

INPUT AND OUTPUT OPERATION DEVICE

TECHNICAL FIELD

The present application relates an input and output operation capable of inclining a manually operable operation unit that is inclinable in an X-axis direction and a Y-axis direction and rotating the operation unit around a Z-axis direction as a central axis of the operation unit (capable of rolling), the input and output operation device also controlling an output of a haptic sense via the operation unit.

BACKGROUND ART

Recently, electronic devices mounted on an automobile are increased in the level and the variety of functions for the purpose of improving safety, security and comfortableness. This complicates the operation procedure to be performed by a driver. For the purpose of simplifying such a complicated operation, an HMI (Human-Machine Interface) that is matched well with the sense of the driver and is highly easy to operate is desired to operate, for example, a navigation device, an air conditioner, an audio device, a radio or the like.

An HMI proposed as having a high affinity is a haptic device including an input device operable in three-axial directions or having a feedback function.

For example, Patent Document 1 discloses a three-axial input operation device that restricts the direction of movement of an operation unit such that the operation unit is movable only in X-, Y- and Z-axis directions and detects the position of the operation unit in the X-, Y- and Z-axis directions.

Patent Document 2 discloses an input operation device that holds an operation unit such that the operation unit is rotatable in three-axial directions and is capable of detecting the rotation angle.

Patent Document 3 discloses a haptic device that rotates an operation device in X- and Y-axis directions, detects an amount of relative positional change around each of the axes, and provides a haptic sense to the operation unit by a motor mounted on a rotation mechanism for each of the axes.

CITATION LIST

Patent Literature

Patent Document 1: Japanese Laid-Open Patent Publication No. Sho 58-172739
Patent Document 2: Japanese Laid-Open Patent Publication No. Hei 5-57645
Patent Document 3: Japanese Laid-Open Patent Publication No. 2005-332039

SUMMARY OF INVENTION

Technical Problem

The conventional input devices and haptic devices are desired to have an HMI easier to operate. A non-limiting illustrative embodiment of the present application provides an input and output operation device and a haptic device that are easier to operate.

Solution to Problem

An input and output operation device according to this disclosure includes an actuator including an operation unit having a surface contactable with a finger; a movable unit having the operation unit and at least one attraction magnet mounted thereon and including a concaved portion in a part thereof; a secured unit including a convexed spherical surface loosely engageable with at least one magnetic member and the concaved portion of the movable unit, the convexed spherical surface being point-contactable or line-contactable with the concaved portion of the movable unit by a magnetic attraction force between the at least one attraction magnet and the at least one magnetic member, the secured unit supporting the movable unit such that the movable unit is freely rotatable as centered around a spherical center of the convexed spherical surface; a first driving unit rotating the operation unit, with respect to the secured unit, as centered around an X-axis passing the spherical center; a second driving unit rotating the operation unit, with respect to the secured unit, as centered around a Y-axis perpendicular to the X-axis on a plane including the X-axis; a third driving unit rotating the movable unit, with respect to the secured unit, as centered around a Z-axis perpendicular to the X-axis and the Y-axis, the Z-axis being a central axis of the operation unit; and a detector detecting a first rotation angle of the operation unit, with respect to the secured unit, around the X-axis and a second rotation angle of the operation unit, with respect to the secured unit, around the Y-axis. The spherical center of the convexed spherical surface is provided at an origin of the X-axis, the Y-axis and the Z-axis. The input and output operation device further includes a detection circuit unit generating first and second rotation angle signals from the first and second rotation angles; a control computation processing unit generating first and second target rotation angle signals based on the first and second rotation angle signals; and a driving circuit unit receiving the first and second target rotation angle signals and generating a signal usable to drive the first and second driving units.

Advantageous Effects of Invention

According to the input and output operation device of this disclosure, the spherical center of the spherical convexed portion provided in the secured unit, and the central axis of the conical concaved contact surface provided in the movable unit so as to contact the convexed portion, are provided on a line extended from the central axis of the operation unit having a surface contactable with a finger. In addition, the movable unit is structured such that two divided units thereof are joined together so as to wrap the spherical convexed portion. As a result, the movable unit having the operation unit mounted thereon is supported at the center of gravity, and the mechanical resonance is significantly suppressed in the driving frequency range.

As a result, the input and output operation device realizes a three-axial high-speed operation on the operation unit, and allows the operator to feel a novel haptic sense not realized by the conventional art.

BRIEF DESCRIPTION OF DRAWINGS

FIG. 7 is an isometric view of a secured unit in embodiment 1 according to the present disclosure, as seen from above the actuator 165.

FIG. 13A is a plan view of the actuator 165 deprived of the fall-preventive member 201 in embodiment 1 according to the present disclosure, as seen in the direction of the Z-axis 10, in the state where the actuator 165 is rotated in the rotation direction 20 and the rotation direction 21 at an equal angle, namely, is rotated at synthesis angle θxy.

FIG. 13B is a cross-sectional view of the actuator 165 deprived of the fall-preventive member 201 in embodiment 1 according to the present disclosure, taken along a plane including the Z-axis 10 and the straight line 13, in the state where the actuator 165 is rotated in the rotation direction 20 and the rotation direction 21 at an equal angle, namely, is rotated at synthesis angle θxy.

DESCRIPTION OF EMBODIMENTS

Figure 1:
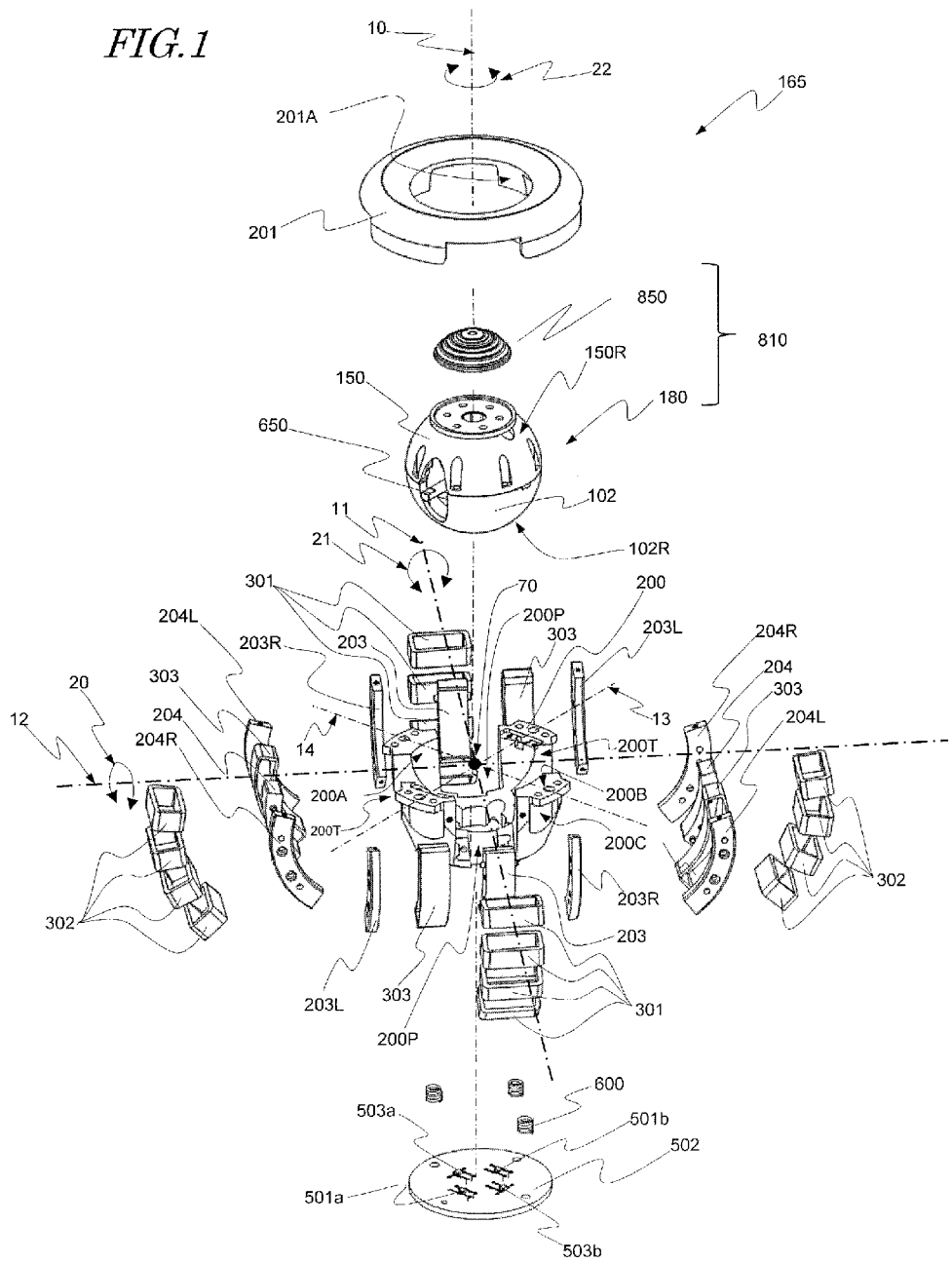
FIG. 1 is an exploded isometric view showing a general structure of an actuator 165 in an input and output operation device 750 in embodiment 1 according to the present disclosure.

For example, a vehicle-mountable input device that receives an operation made by an operator is desired to be operable in a driver-friendly intuitive manner, to be operable in a blind manner, namely, without the operator looking at an operation unit, and to be operable in a sophisticated manner so as to allow the vehicle to be driven comfortably, from the viewpoint of safety and security.

In general, many multiple-axial input devices are realized by a combination of a plurality of rotation mechanisms rotatable as centered around axes because such mechanisms are combined relatively easily. The rotation mechanism for each axis is coupled with a driving motor via a transfer mechanism such as a gear or the like (rack and pinion, worm wheel and worm gear), so that an operation unit is driven to rotate as centered around the respective rotation axis. A driving shaft of the driving motor is provided with an encoder or the like, so that an amount of relative positional change of the operation unit is detected.

However, such a structure increases the weight of the movable operation unit and thus tends to enlarge the input device itself. A bearing of the rotation mechanism causes rattling noise or play in an axial direction because of a bearing gap, which may cause abnormal noise or a mechanical or structural failure.

The transfer mechanism such as a gear or the like provided between the movable unit and the driving motor needs to have a backlash. Such a gap is enlarged due to abrasion or the like, which may decrease the positional precision of the operation unit, generate mechanical vibrations or noise, and shorten the life of the device.

In the case where a relative position of the operation unit is to be detected by an encoder or the like, the absolute position of the operation unit is only detected after the origin is detected by a start/finish terminal switch. This requires the absolute position to be converted into a count and also requires the operation unit to be returned to the start/finish terminal at the time of resetting.

The technologies disclosed in Patent Documents 1 through 3 may have such problems. In light of such problems, the inventors of the present application conceived a novel input device.

An input and output operation device according to this disclosure includes an actuator including an operation unit having a surface contactable with a finger; a movable unit having the operation unit and at least one attraction magnet mounted thereon and including a concaved portion in a part thereof; a secured unit including a convexed spherical surface loosely engageable with at least one magnetic member and the concaved portion of the movable unit, the convexed spherical surface being point-contactable or line-contactable with the concaved portion of the movable unit by a magnetic attraction force between the at least one attraction magnet and the at least one magnetic member, the secured unit supporting the movable unit such that the movable unit is freely rotatable as centered around a spherical center of the convexed spherical surface; a first driving unit rotating the operation unit, with respect to the secured unit, as centered around an X-axis passing the spherical center; a second driving unit rotating the operation unit, with respect to the secured unit, as centered around a Y-axis perpendicular to the X-axis on a plane including the X-axis; a third driving unit rotating the movable unit, with respect to the secured unit, as centered around a Z-axis perpendicular to the X-axis and the Y-axis, the Z-axis being a central axis of the operation unit; and a detector detecting a first rotation angle of the operation unit, with respect to the secured unit, around the X-axis and a second rotation angle of the operation unit, with respect to the secured unit, around the Y-axis. The spherical center of the convexed spherical surface is provided at an origin of the X-axis, the Y-axis and the Z-axis. The input and output operation device further includes a detection circuit unit generating first and second rotation angle signals from the first and second rotation angles; a control computation processing unit generating first and second target rotation angle signals based on the first and second rotation angle signals; and a driving circuit unit receiving the first and second target rotation angle signals and generating a signal usable to drive the first and second driving units.

In a preferable embodiment, the control computation processing unit generates a current position coordinate pair of the operation unit in a two-dimensional coordinate system corresponding to a movable range of the operation unit based on the first and second rotation angle signals, and generates the first and second target rotation angle signals based on a position feedback control performed by use of a difference between a target position coordinate pair and the current position coordinate pair.

In a preferable embodiment, the control computation processing unit sets, in the two-dimensional coordinate system, an identification coordinate area including the target position coordinate pair and being usable as a target; and in the case where the current position coordinate pair of the operation unit is inside the identification coordinate area, sets a first gain of the position feedback control, whereas in the case where the current position coordinate pair of the operation unit is outside the identification coordinate area, sets a gain larger than the first gain.

In a preferable embodiment, the control computation processing unit sets a plurality of identification coordinate areas to be targets in the two-dimensional coordinate system; sets the target position coordinate pair in one identification coordinate area selected from the plurality of identification coordinate areas in accordance with the current position coordinate pair of the operation unit or an external signal; and in the case where the current position coordinate pair of the operation unit is inside the identification coordinate area, sets the first gain of the position feedback control, whereas in the case where the current position coordinate pair of the operation unit is outside the identification coordinate area, sets a gain large than the first gain.

In a preferable embodiment, the control computation processing unit generates a driving signal having a predetermined driving waveform pattern; the driving circuit unit receives the driving signal and generates a signal usable to drive the third driving unit; and the movable unit is driven to vibrate around the Z-axis by the third driving unit.

In a preferable embodiment, the predetermined driving waveform pattern includes a vibration waveform having a frequency component in an audible range.

In a preferable embodiment, the detector includes a first detection unit detecting the rotation angles of the operation unit, with respect to the secured unit, around the X-axis and the Y-axis; and a second detection unit detecting a rotation angle of the operation unit, with respect to the secured unit, around the Z-axis.

In a preferable embodiment, the concaved portion of the movable unit includes a convexed spherical surface, and the convexed spherical surface of the secured unit forms a concaved portion.

In a preferable embodiment, the concaved portion of the movable unit has a conical surface.

In a preferable embodiment, the movable unit has an opening into which a holder bar securing the convexed spherical surface is insertable, and the rotation angles of the movable unit are restricted by contact of the holder bar with the opening.

In a preferable embodiment, the input and output operation device further includes a fall-preventive member provided in the secured unit, the fall-preventive member having a restriction surface restricting movement of the movable unit such that the movable unit does not fall from the secured unit. The restriction surface includes a concaved partial surface having a center matching the spherical center.

In a preferable embodiment, the first driving unit includes a pair of first driving magnets located in the movable unit symmetrically with respect to the Z-axis; a pair of first magnetic yokes located in the secured unit so as to respectively face the pair of first driving magnets; and a pair of first driving coils respectively wound around the pair of first magnetic yokes. The second driving unit includes a pair of second driving magnets located in the movable unit symmetrically with respect to the Z-axis; a pair of second magnetic yokes located in the secured unit so as to respectively face the pair of second driving magnets; and a pair of second driving coils respectively wound around the pair of second magnetic yokes. The pair of first driving magnets and the pair of first driving coils are located on a straight line passing the spherical center of the convexed spherical surface; the pair of second driving magnets and the pair of second driving coils are located on another straight line passing the spherical center of the convexed spherical surface and crossing the straight line perpendicularly; and a center between the first driving magnets, a center between the first driving coils, a center between the second driving magnets, and a center between the second driving coils in the Z-axis direction substantially match the spherical center of the convexed spherical surface positionally.

In a preferable embodiment, the third driving unit includes third driving coils respectively wound around the pair of first magnetic yokes and the pair of second magnetic yokes; and the pair of first driving magnets and the pair of second driving magnets are used as third driving magnets.

In a preferable embodiment, the at least one magnetic member includes the pair of first magnetic yokes and the pair of second magnetic yokes.

In a preferable embodiment, the at least one attraction magnet includes the pair of first driving magnets and the pair of second driving magnets.

In a preferable embodiment, in the state where the movable unit is at a neutral position, the pair of first driving magnets and the pair of second driving magnets are located to be inclined downward at a rotation angle A of 45 degrees or smaller with respect to a horizontal plane that is vertical to the Z-axis and passes the spherical center; and the pair of first driving coils and the pair of first magnetic yokes, and the pair of second driving coils and the pair of second magnetic yokes, are located on a circumference in the secured unit so as to face the pair of first driving magnets and the pair of second driving magnets.

In a preferable embodiment, the rotation angle A is 15 degrees or larger and 25 degrees or smaller.

In a preferable embodiment, the pair of first driving magnets and the pair of second driving magnets are located inside the movable unit and are not exposed on an outer surface of the movable unit.

In a preferable embodiment, the pair of first driving coils, the pair of second driving coils and the pair of third driving coils are located inside the secured unit and are not exposed on an outer surface of the secured unit.

In a preferable embodiment, the movable unit is formed of a resin material.

In a preferable embodiment, the movable unit is integrally molded with the pair of first driving magnets and the pair of second driving magnets.

In a preferable embodiment, the secured unit is formed of a resin material.

In a preferable embodiment, the secured unit is integrally molded with the pair of first driving coils, the pair of second driving coils, the third driving coils, the pair of first magnetic yokes and the pair of second magnetic yokes.

In a preferable embodiment, the center of gravity of the movable unit matches the spherical center.

In a preferable embodiment, the first detection unit includes a first magnetic sensor secured to the secured unit; and a rotation detection magnet provided in the movable unit. The first magnetic sensor detects a magnetic force change caused by a rotation of the rotation detection magnet and calculates a two-dimensional rotation angle around the X-axis and the Y-axis.

In a preferable embodiment, the first magnetic sensor and the rotation detection magnet are located on the Z-axis.

In a preferable embodiment, the first detection unit includes an optical sensor secured to the secured unit; and an optical detection pattern provided on a part of the convexed spherical surface of the movable unit. The optical sensor detects a change in light incident on the optical sensor, the change being caused by a rotation of the optical detection pattern, and calculates a two-dimensional rotation angle of the operation unit around the X-axis and the Y-axis.

In a preferable embodiment, the optical sensor and the optical detection pattern are located on the Z-axis.

In a preferable embodiment, in the case where the movable unit is at a neutral position, the first magnetic sensor is located, on a plane perpendicular to the Z-axis, on a straight line having an angle of 45 degrees with respect to a straight line connecting the pair of first driving magnets and a straight line connecting the pair of second driving magnets.

In a preferable embodiment, the second detection unit includes a pair of rotation detection magnets located in the movable unit symmetrically with respect to the Z-axis; and a pair of second magnetic sensors secured to the secured unit so as to respectively face the pair of rotation detection magnets. The pair of second magnetic sensors detect a magnetic force change caused by a rotation of the rotation detection magnets and calculates a rotation angle of the operation unit.

In a preferable embodiment, the pair of rotation detection magnets include magnets located on a plane perpendicular to the Z-axis, parallel to a straight line passing the spherical center, and magnetized to two poles in opposite directions from each other.

In a preferable embodiment, the restriction surface of the fall-preventive member and the outer surface of the movable unit has a gap therebetween, and the gap is determined such that even if the concaved portion of the movable unit is separated from the convexed spherical surface of the secured unit, the movable unit is returned to a point contact state or a line contact state by the magnetic attraction force.

In a preferable embodiment, the input and output operation device further includes an electrode contactable with the operator; and a communication unit performing a communication via the operator in contact with the electrode. The control computation processing unit determines an attribute of the operator based on information received by the communication unit.

In a preferable embodiment, the input and output operation device includes a movable operation unit including the operation unit and the movable unit. The control computation processing unit selects at least one of a plurality of types of pointer operation patterns prepared in advance, in accordance with the determined attribute of the operator; and causes a force contrary to an operation force to act on the movable unit operation unit by the first and second driving unit, in accordance with the selected pointer operation pattern.

In a preferable embodiment, the pointer operation pattern restricts an operation range of a pointer such that the pointer does not go outside an area enclosed by a preset borderline.

In a preferable embodiment, the pointer operation pattern restricts an operation range of a pointer such that the pointer is not diverted from a preset track.

In a preferable embodiment, the pointer operation pattern restricts an operation range of a pointer such that the pointer is not diverted from an area formed of a plurality of secured areas and a track connecting the plurality of areas.

In a preferable embodiment, the electrode is located at a position that allows the electrode to contact the finger of the operator operating the operation unit.

In a preferable embodiment, the operator is in contact with an electrode of a communication tag; and the communication unit communicates with the communication tag via the operator to receive information held by the communication tag.

According to the input and output operation device of this disclosure, the spherical center of the spherical convexed portion provided in the secured unit, and the central axis of the conical concaved contact surface provided in the movable unit so as to contact the convexed portion, are provided on a line extended from the central axis of the operation unit having a surface contactable with a finger. In addition, the movable unit is structured such that two divided units thereof are joined together so as to wrap the spherical convexed portion. As a result, the movable unit having the operation unit mounted thereon is supported at the center of gravity, and the mechanical resonance is significantly suppressed in the driving frequency range.

In a pivot structure including the convexed portion of the secured unit and the concaved contact surface of the movable unit, a normal force of a constant level is provided by a magnetic attraction force that is not influenced by the pivoting angle. With such a structure, the frictional load is suppressed from being changed in accordance with the pivoting angle, and a good phase gain characteristic is realized in the driving frequency range.

Conventionally, there is a serious problem, specific to a support structure using a magnetic attraction force, that the movable unit may fall by an external disturbance such as vibration, impact or the like. In order to avoid this, the secured unit is provided with the fall-preventive restriction surface via a predetermined gap in which the movable unit is pivotable. With such a structure, the fall of the movable unit is prevented with certainty while the device is prevented from being enlarged.

A gap is provided with a distance with which even if the concaved contact surface is away from the convexed portion by the distance of the gap, the concaved contact surface is moved toward the convexed portion by a magnetic attraction force and returned to a contact state. With such a structure, the movable unit, even if falling instantaneously, is returned to the original state of being well supported promptly. Thus, the input and output operation device is highly safe.

The rotation driving unit for rotation around the X-axis, the Y-axis and the Z-axis includes two pairs of driving magnets, secured to the movable unit, that are located on a circumference as centered around the Z-axis and are perpendicular to each other, and two pairs of driving coils and two pairs of magnetic yokes secured to the secured unit so as to face the driving magnets. The height positions of these elements on the Z-axis are substantially equal to the height position the spherical center of the convexed portion. With such a structure, the movable unit is driven at the center of gravity, and the mechanical resonance is significantly suppressed in the driving frequency range.

The area sizes of the projection regions of the magnetic yokes facing the driving magnets are substantially equal to each other. With such a structure, in the case where the rotation angles of the movable unit around the X-axis and the Y-axis and the rotation angle thereof in the Z-axis are 0 degrees, the neutral point of the movable unit by the magnetic spring provided by the magnetic yokes and the driving magnets is maintained.

After being rotated, the movable unit is returned to the neutral point by the magnetic spring. This does not require any specific structure or any additional electric current for the returning operation.

In an operation input device such as a vehicle-mountable electronic shifter or the like, the movable unit needs to be automatically returned to, and held at, the neutral position after being moved to a set shift position. The input and output operation device according to the present disclosure is capable of returning the movable unit to the neutral point by a magnetic spring and thus is applicable to an electronic shifter or the like.

The actuator has a good frequency response characteristic and a high rotation angle resolution, and therefore has a very high detection sensitivity on the operation of the movable unit moved by a finger. Thus, the actuator may even detect flick input and swipe input, and also character input, often used for mobile terminals.

The conical surface of the concaved portion of the movable unit or the surface of the convexed spherical surface of the secured unit, which are both contact surfaces, may be covered with a resin member. In this case, a support structure that provides little friction and is highly abrasion-resistant is realized.

The gap in the pivot structure, including the conical concaved contact surface and the concaved partial spherical surface that are loosely engageable with each other, may be filled with a viscous member or a magnetic fluid for vibration attenuation. In this case, the amplitude enhancement factor (Q factor) or the Q factor of mechanical inherent vibrations, which are caused by a magnetic attraction force generated between the driving magnets provided in the movable unit and the magnetic yokes provided in the secured unit, are decreased and thus a good control characteristic is provided.

As described above, according to the present disclosure, a pivot support system, capable of providing a rotation around the X-axis and the Y-axis at a large angle of ±25 degrees or larger and a rotation around the Z-axis at an angle of ±5 degrees or larger, is located at the spherical center, which is the origin. Thus, a good input/output control on the operation unit is realized in a broadband frequency range up to about 200 Hz.

As a result, a three-axial high-speed operation on the operation unit around the X-axis, the Y-axis and the Z-axis is realized, and the operator is allowed to feel a novel haptic sense not realized by the conventional art.

Three-axial simultaneous operations are realized, by which the operation unit is rotated rightward or leftward as centered around the Z-axis while being rotated around the X-axis and the Y-axis. Therefore, enlargement or contraction of a screen by pinch input or substitute input for scroll input, which is often used for mobile terminals, is made detectable.

The solid fall-preventive structure for the movable unit is realized with a compact size. Therefore, the input and output operation device completely protects the movable unit against an external disturbance such as vibration, impact at the time of falling or the like, and is highly safe.

Embodiment 1

Hereinafter, an input and output operation device in embodiment 1 according to the present disclosure will be described.

Figure 2:
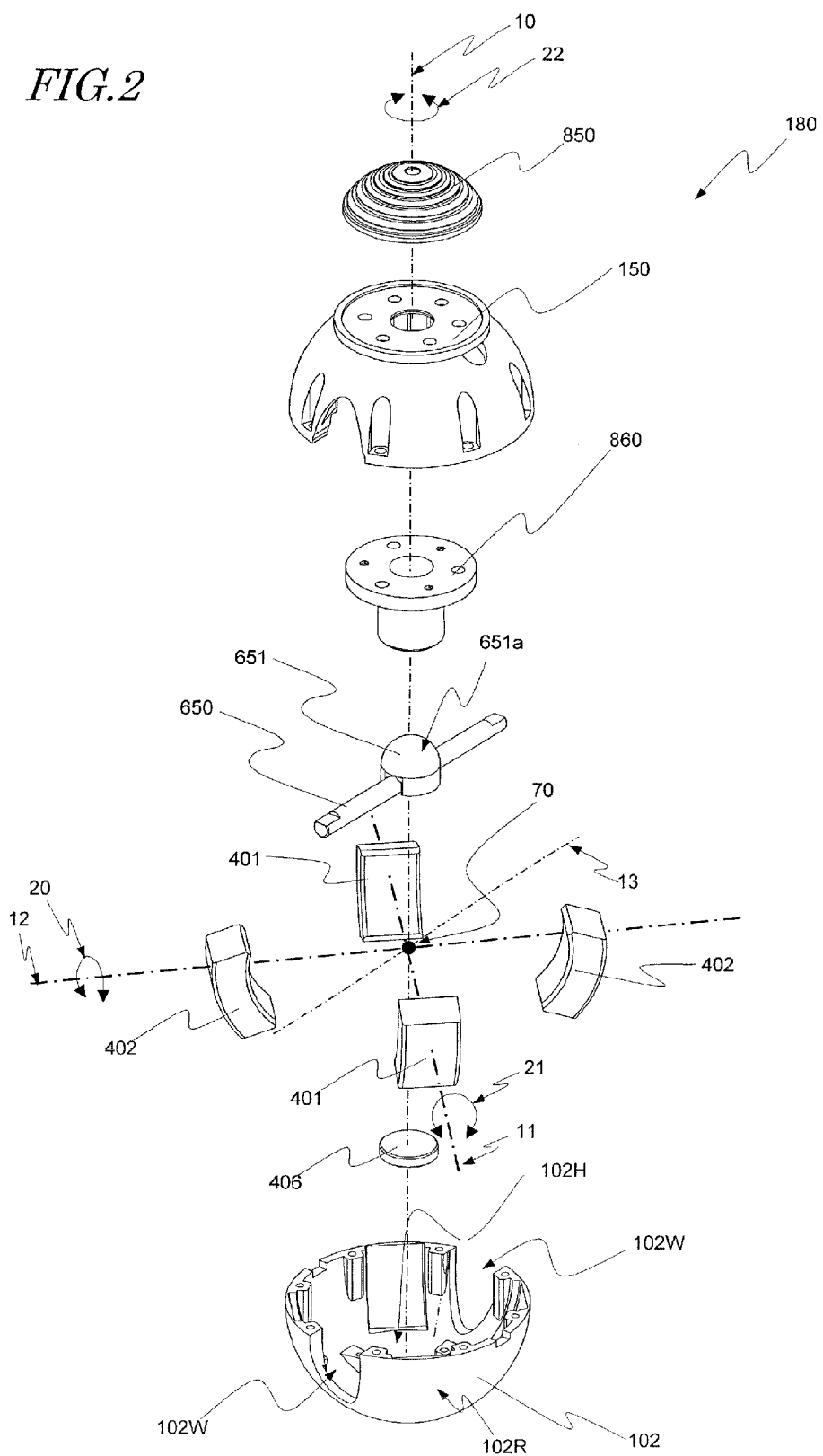
FIG. 2 is an exploded isometric view showing, in detail, a structure of a movable unit 180 in the actuator 165 in embodiment 1 according to the present disclosure.
Figure 3A:
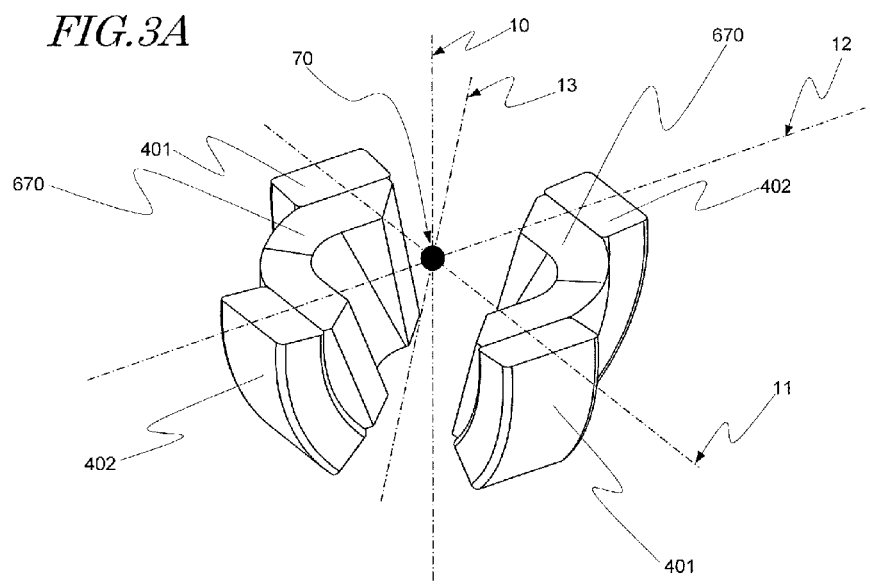
FIG. 3A is an isometric view of magnetic back yokes 670 in the movable unit 180 in the actuator 165 in embodiment 1 according to the present disclosure, as seen from above.
Figure 3B:
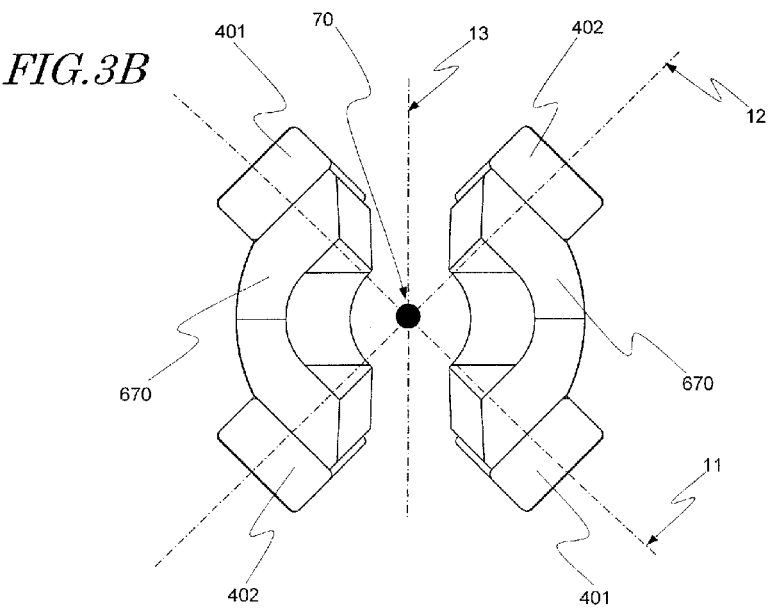
FIG. 3B is a plan view of the magnetic back yokes 670 in the movable unit 180 in the actuator 165 in embodiment 1 according to the present disclosure, as seen from above in a direction of a Z-axis 10.
Figure 4A:
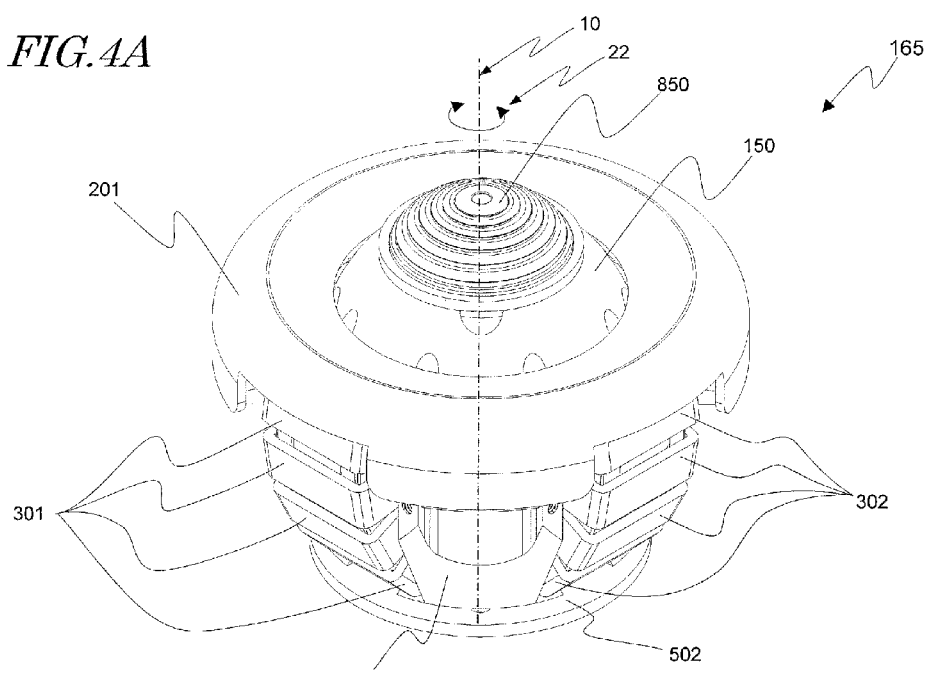
FIG. 4A is an isometric view of the actuator 165 in embodiment 1 according to the present disclosure, as seen from above.
Figure 4B:
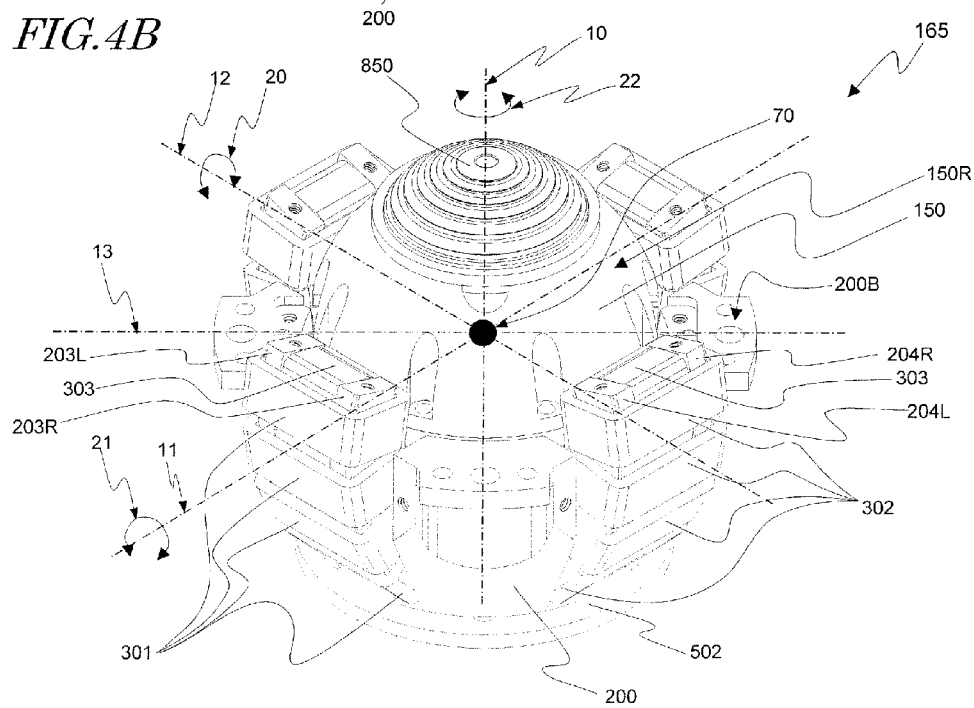
FIG. 4B is an isometric view of the actuator 165 deprived of a fall-preventive member 201 in embodiment 1 according to the present disclosure, as seen from above.
Figure 4C:
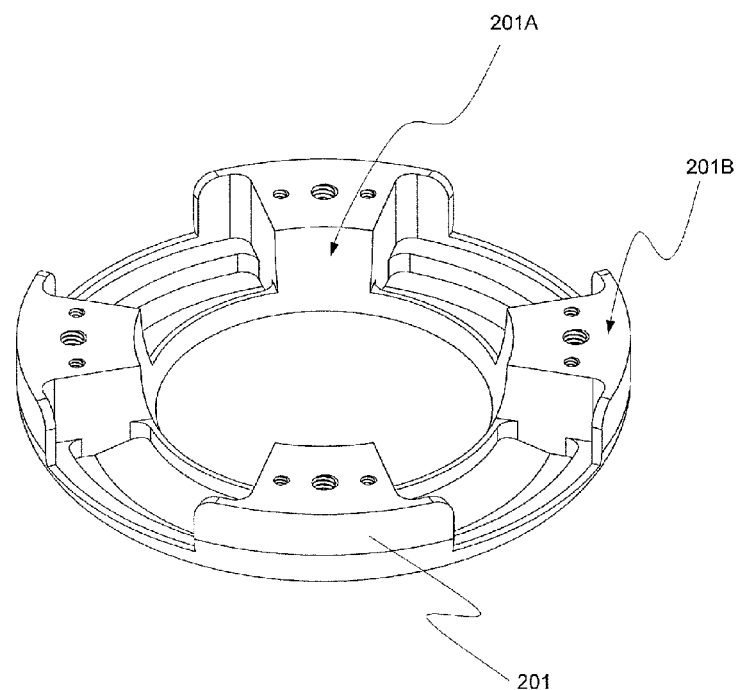
FIG. 4C is an isometric view of the fall-preventive member 201 in embodiment 1 according to the present disclosure, as seen from above the actuator 165.
Figure 5A:
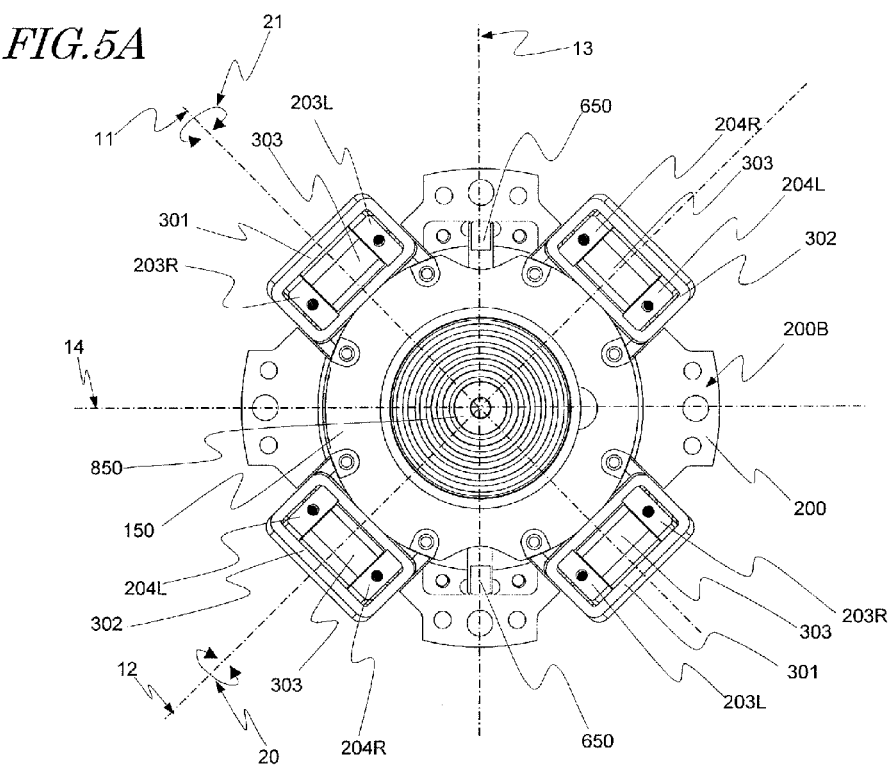
FIG. 5A is a plan view of the actuator 165 in embodiment 1 according to the present disclosure, as seen from above in the direction of the Z-axis 10.
Figure 5B:
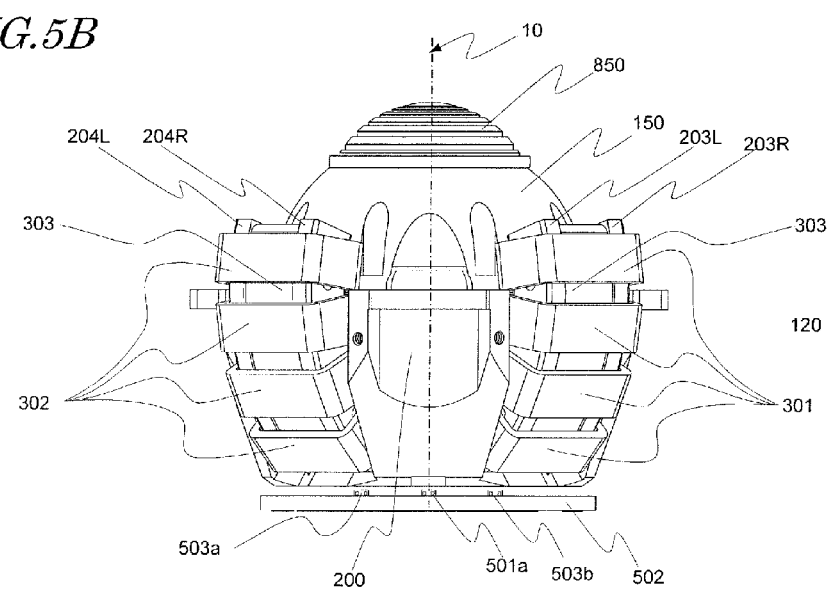
FIG. 5B is a view of the actuator 165 in embodiment 1 according to the present disclosure, as seen in a direction of a straight line 13.
Figure 6:
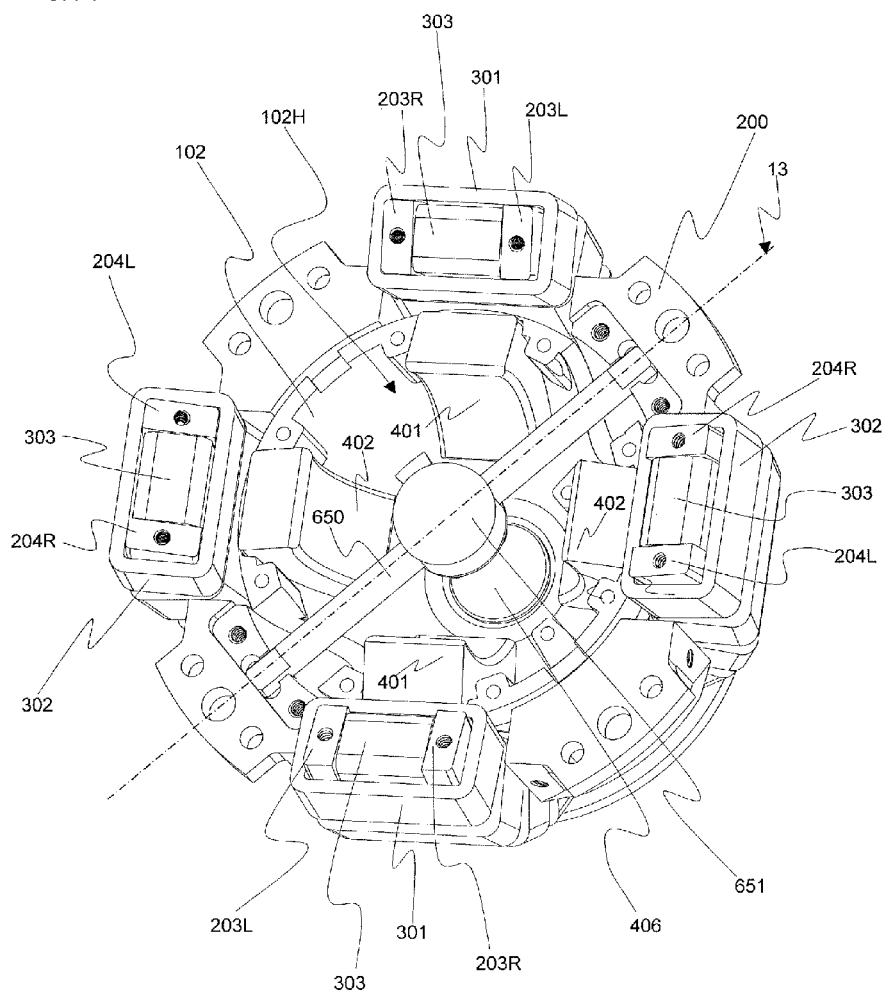
FIG. 6 is an isometric view of the actuator 165 deprived of an operation unit 850 and an upper movable unit 150 in embodiment 1 according to the present disclosure, as seen from above the actuator 165.
Figure 8A:
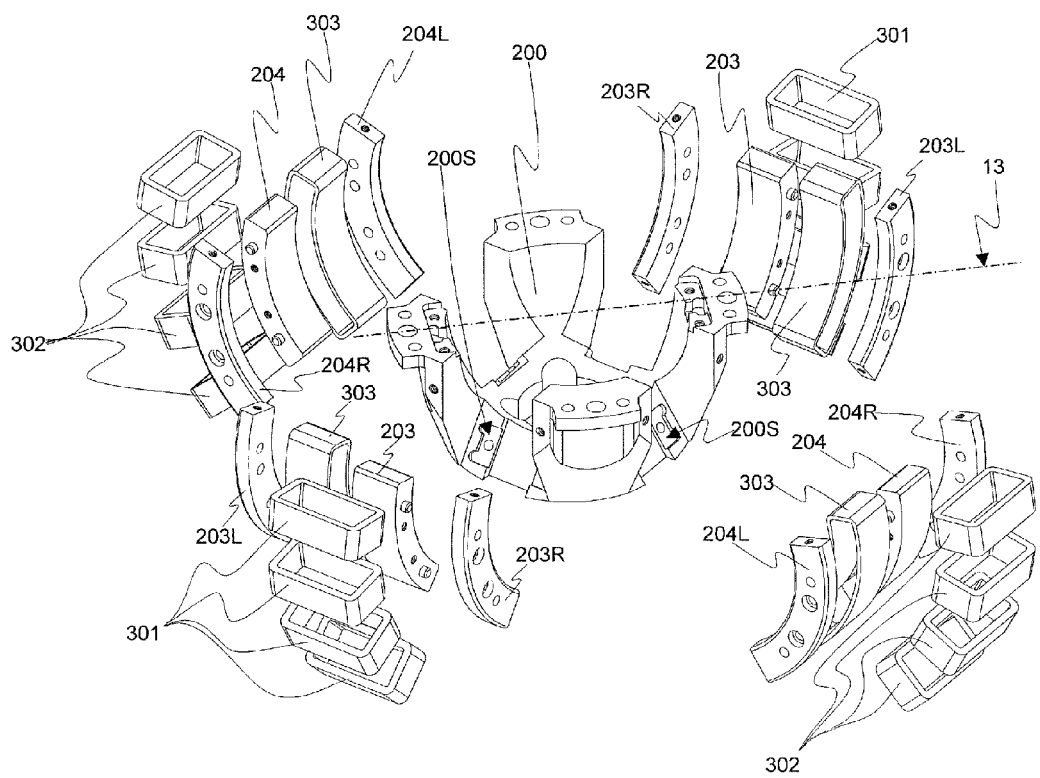
FIG. 8A is an exploded isometric view showing a general structure of the secured unit in the actuator 165 in embodiment 1 according to the present disclosure.
Figure 8B:
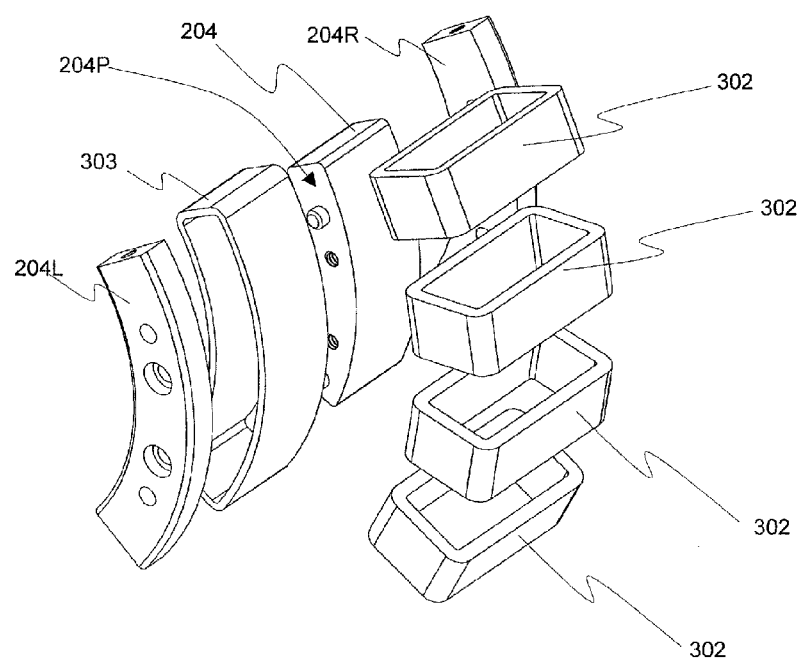
FIG. 8B is an exploded isometric view showing a structure of one driving unit to be mounted on the secured unit in the actuator 165 in embodiment 1 according to the present disclosure.
Figure 9A:
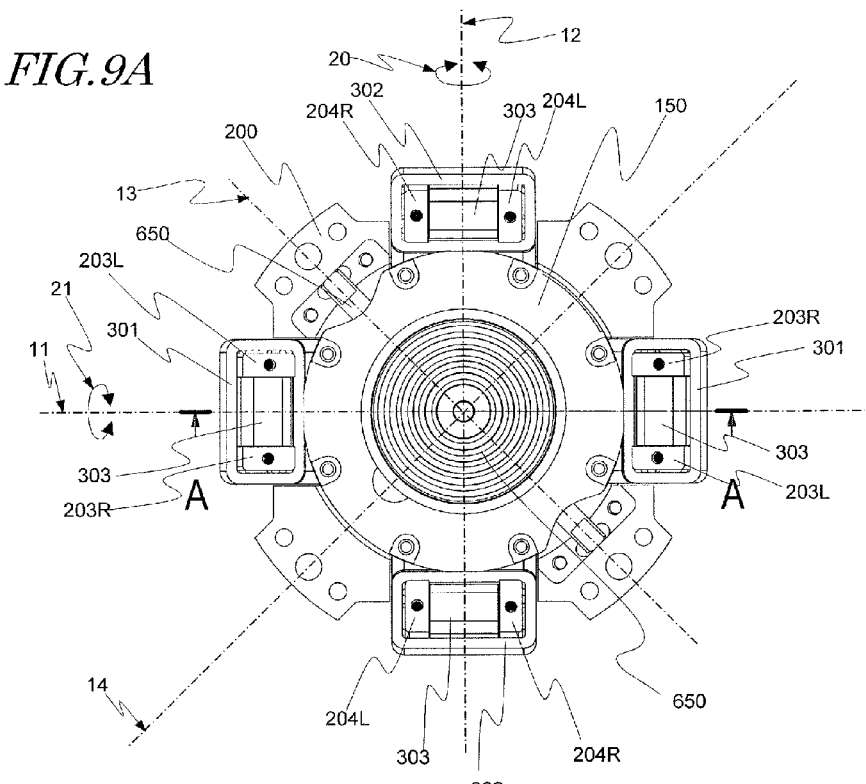
FIG. 9A is a plan view of the actuator 165 in embodiment 1 according to the present disclosure, as seen in the direction of the Z-axis 10.
Figure 9B:
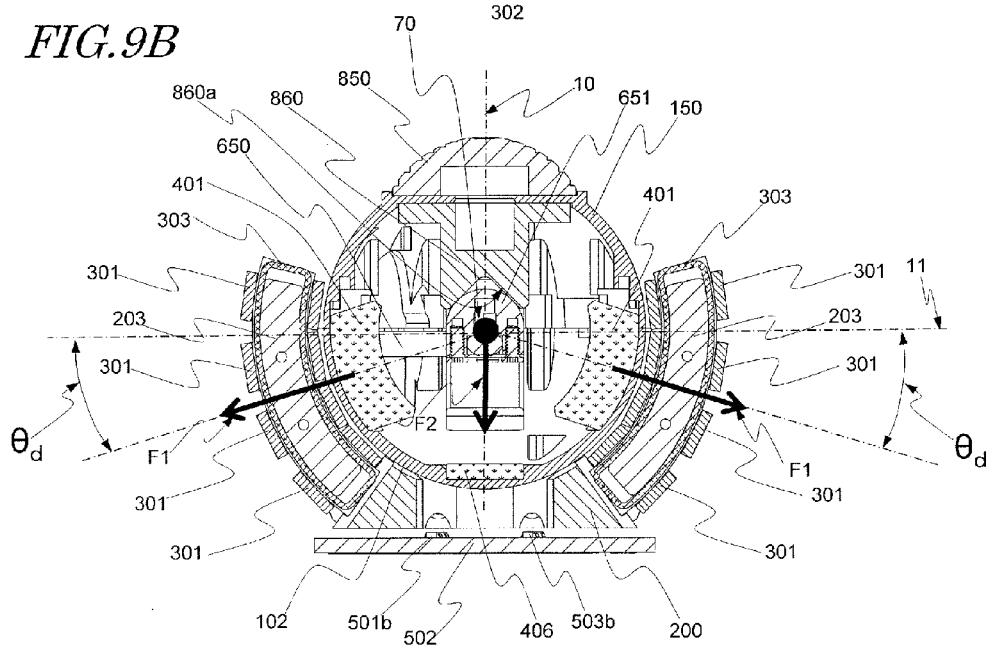
FIG. 9B is a cross-sectional view of the actuator 165 in embodiment 1 according to the present disclosure, taken along a plane including the Z-axis 10 and a rotation axis 11.
Figure 10A:
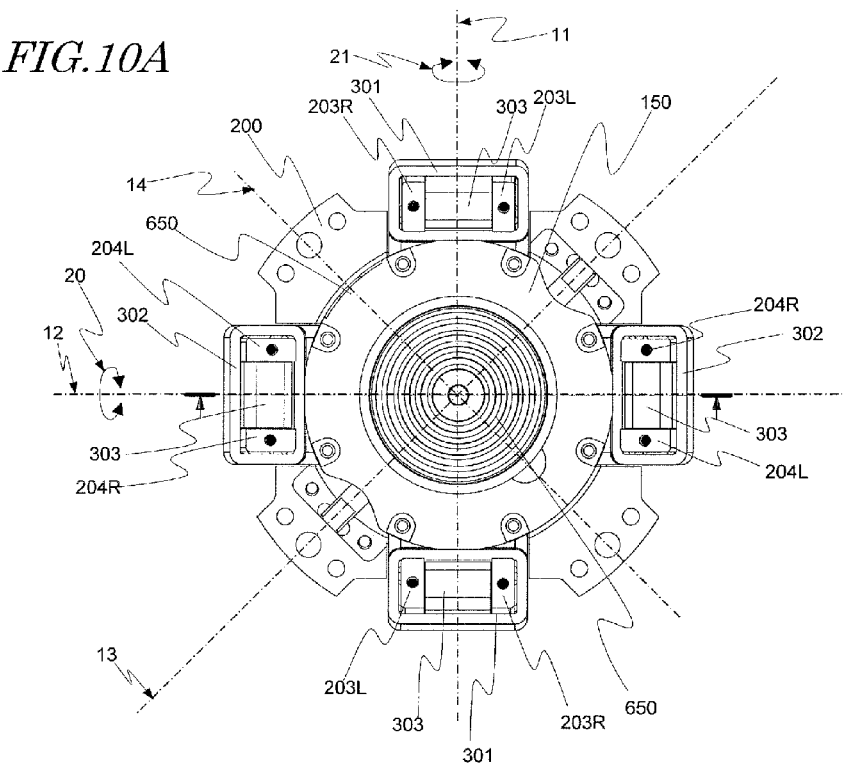
FIG. 10A is a plan view of the actuator 165 in embodiment 1 according to the present disclosure, as seen in the direction of the Z-axis 10.
Figure 10B:
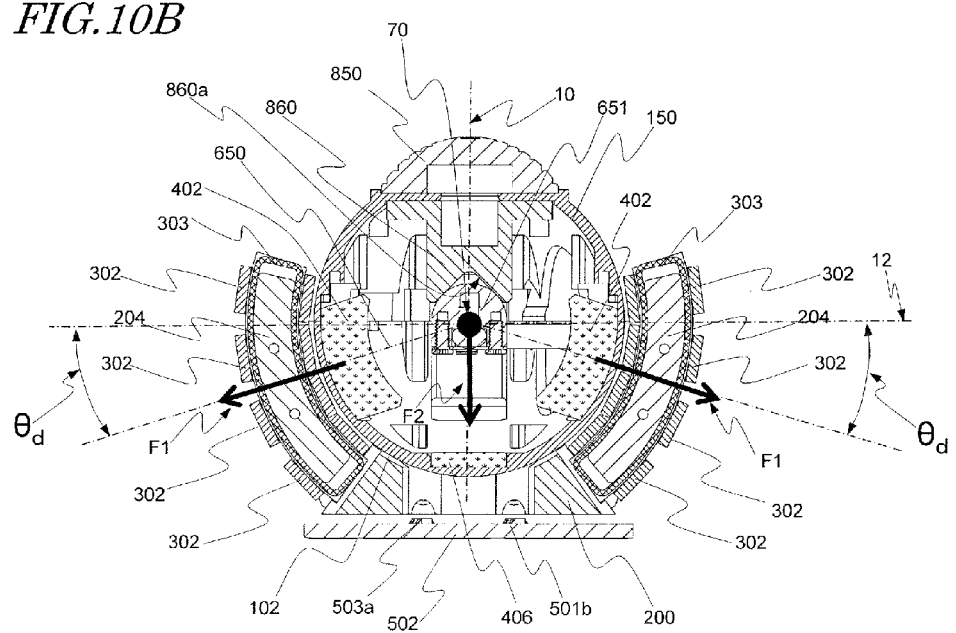
FIG. 10B is a cross-sectional view of the actuator 165 in embodiment 1 according to the present disclosure, taken along a plane including the Z-axis 10 and a rotation axis 12.
Figure 11A:
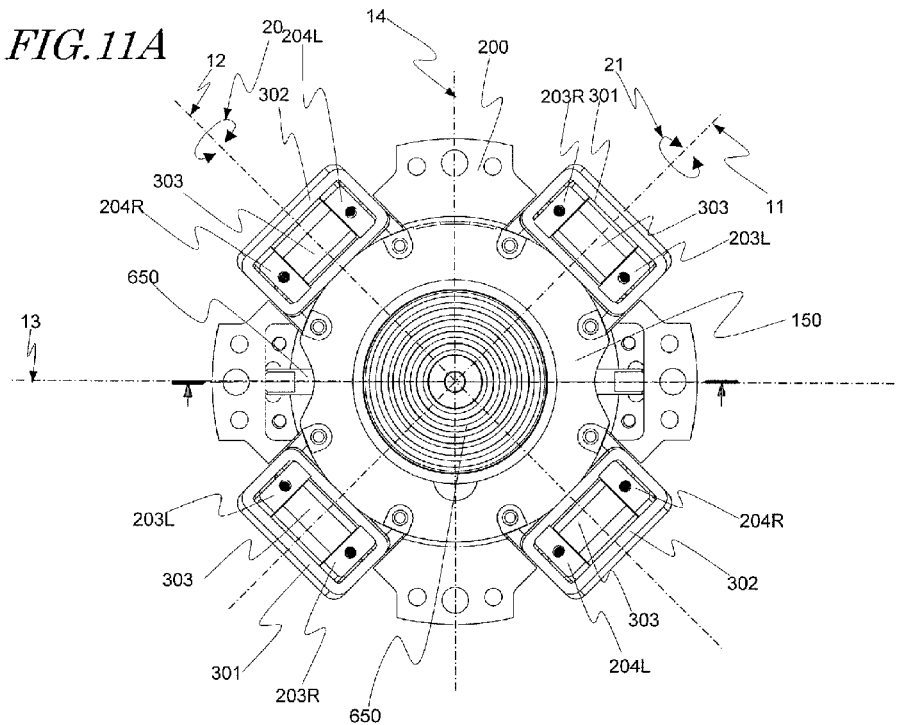
FIG. 11A is a plan view of the actuator 165 in embodiment 1 according to the present disclosure, as seen in the direction of the Z-axis 10.
Figure 11B:
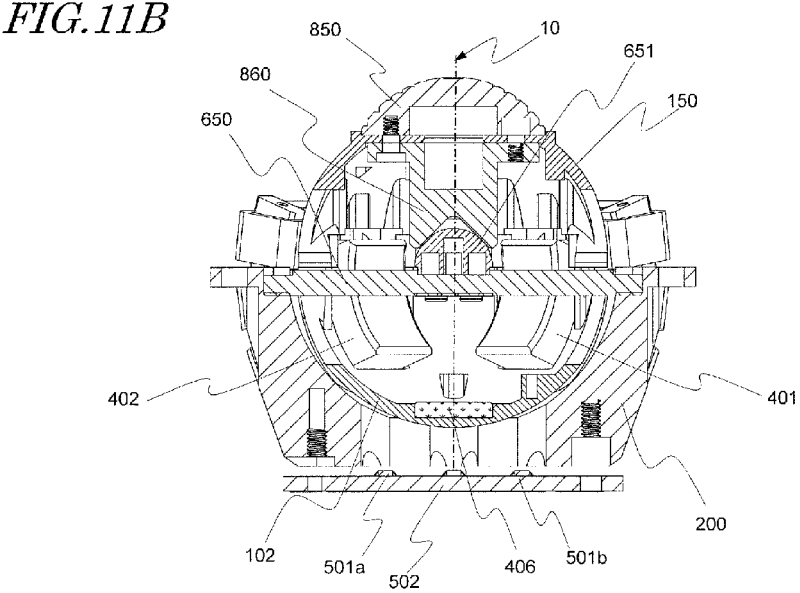
FIG. 11B is a cross-sectional view of the actuator 165 in embodiment 1 according to the present disclosure, taken along a plane including the Z-axis 10 and the straight line 13.
Figure 12:
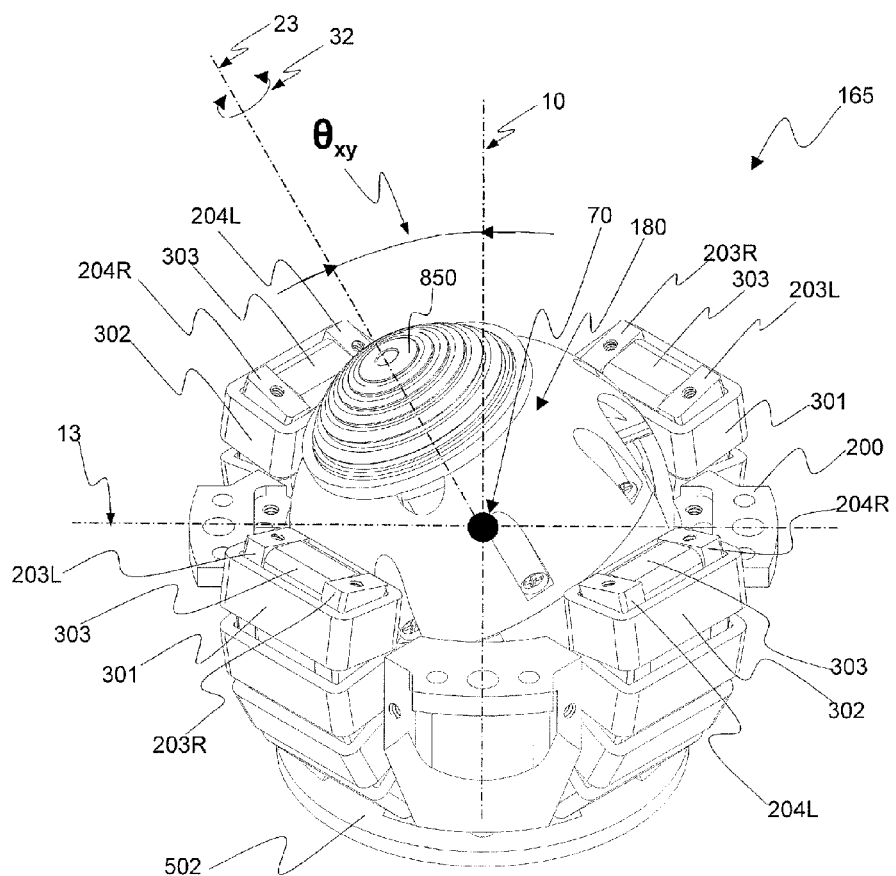
FIG. 12 is an isometric view of the actuator 165 deprived of the fall-preventive member 201 in embodiment 1 according to the present disclosure, as seen from above, in the state where the actuator 165 is rotated in a rotation direction 20 and a rotation direction 21 at an equal angle, namely, is rotated at synthesis angle θxy.
Figure 14A:
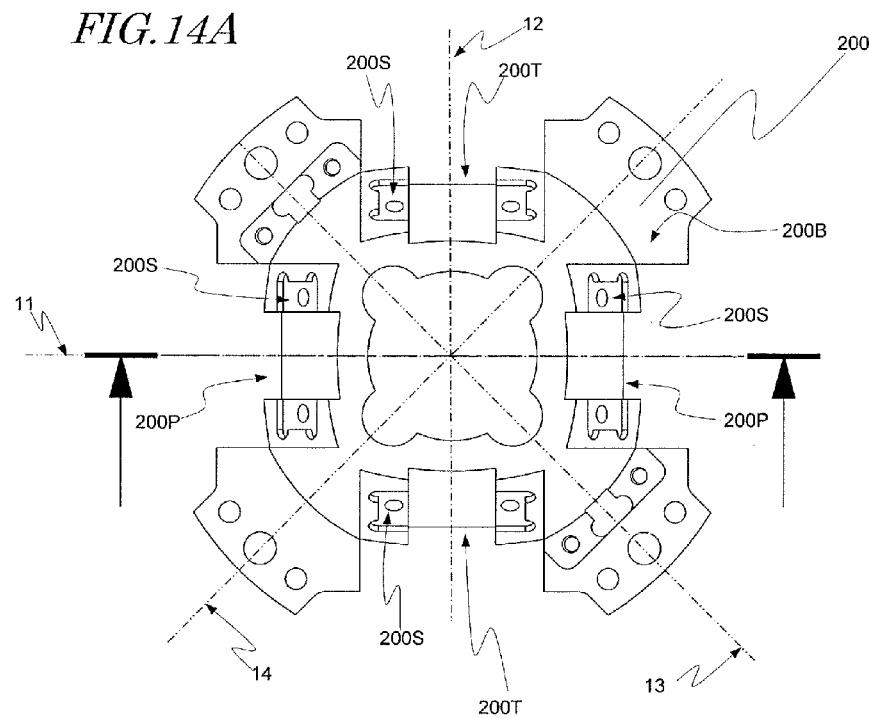
FIG. 14A is a plan view of the secured unit in the actuator 165 in embodiment 1 according to the present disclosure.
Figure 14B:
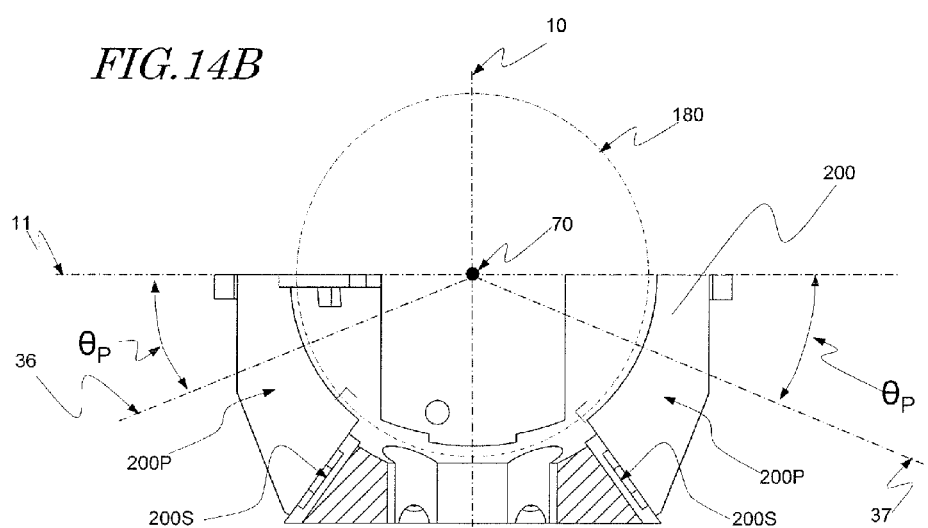
FIG. 14B is a cross-sectional view of the secured unit in the actuator 165 in embodiment 1 according to the present disclosure, taken along a plane including the Z-axis 10 and the rotation axis 11 extending in a direction of a Y-axis.
Figure 15:
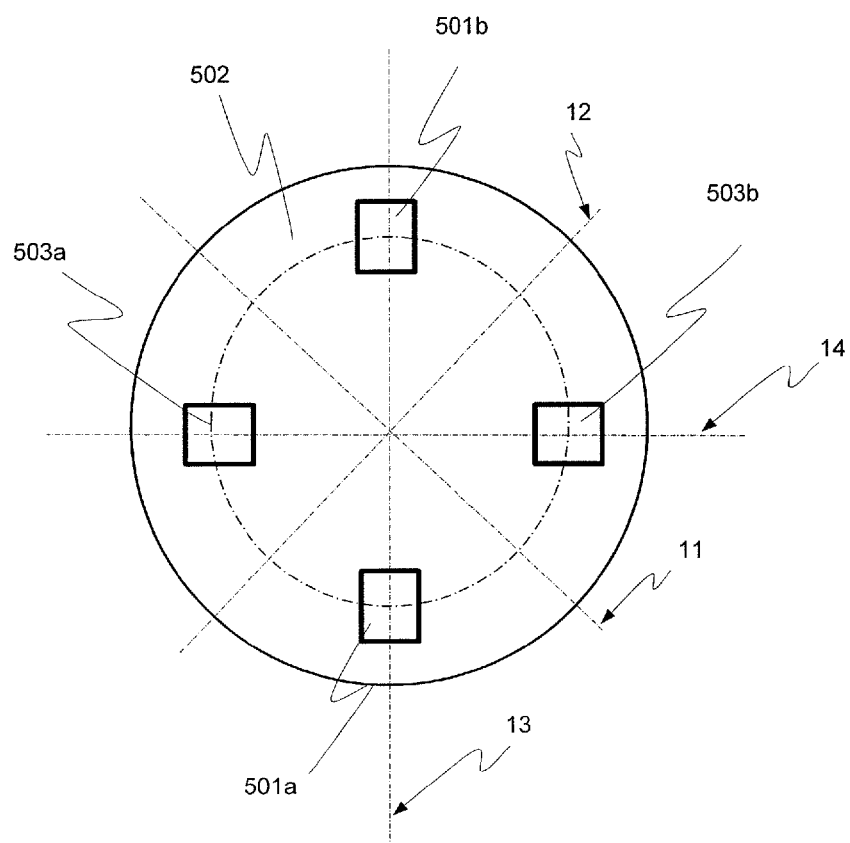
FIG. 15 is a plan view of a sensor substrate 502 in the actuator 165 in embodiment 1 according to the present disclosure, as seen from above the Z-axis 10.
Figure 16:
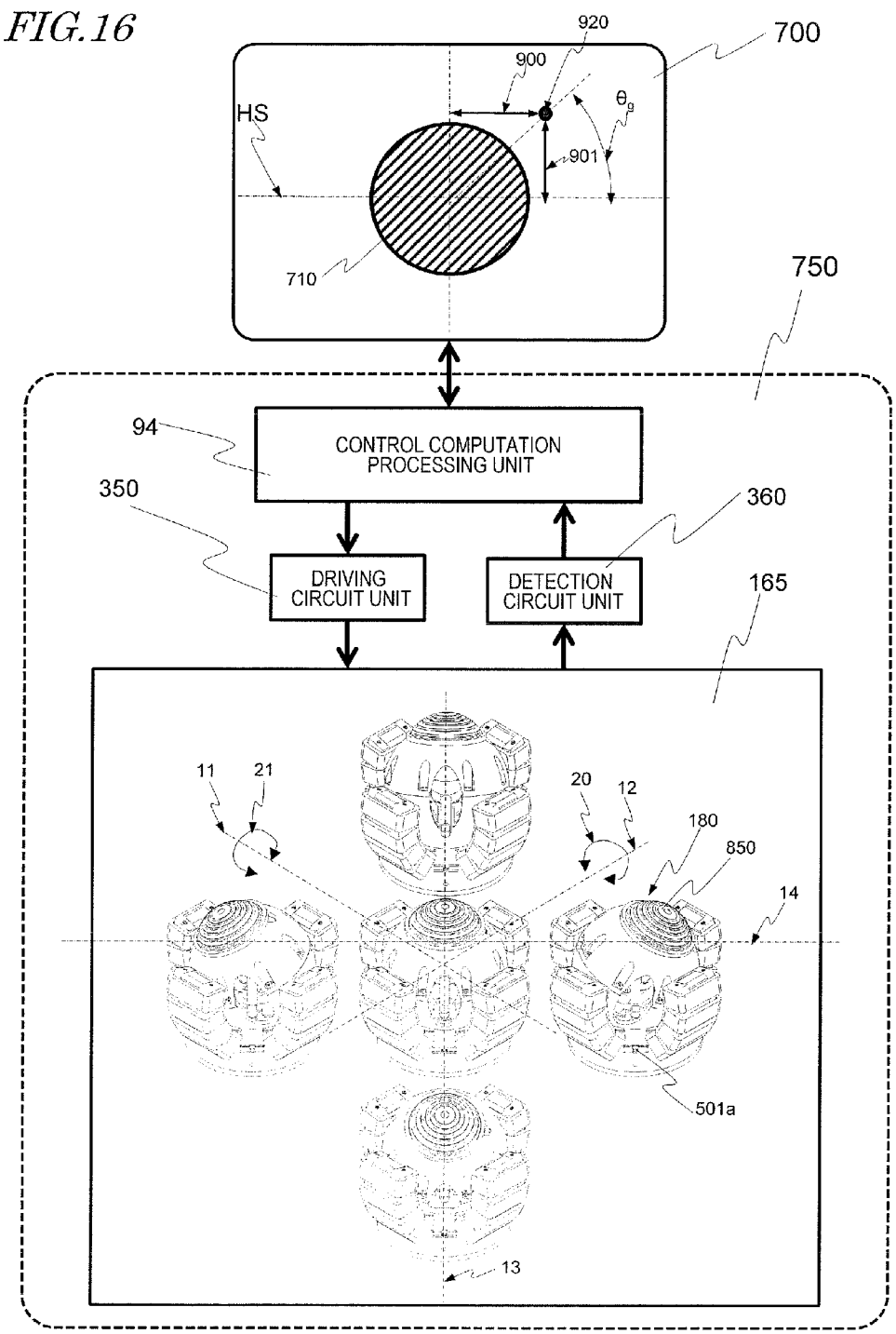
FIG. 16 is a structural view showing the entirety of the input and output operation device 750 in embodiment 1 according to the present disclosure.
Figure 17:
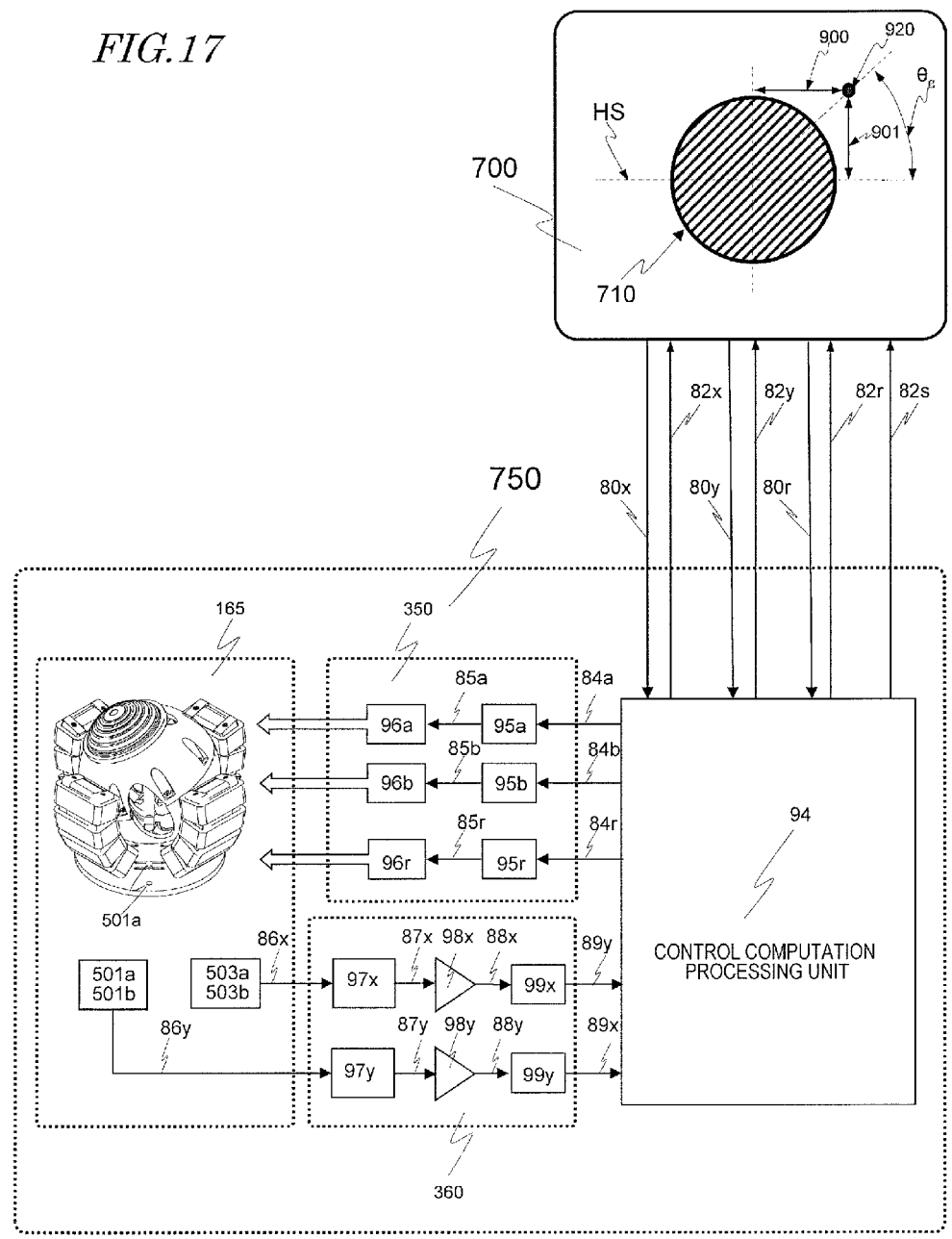
FIG. 17 is a block diagram showing, in detail, a structure of the input and output operation device 750 in embodiment 1 according to the present disclosure.

FIG. 1 is an exploded isometric view of an actuator 165 in an input and output operation device 750 in embodiment 1 according to the present disclosure. FIG. 2 is an exploded isometric view of a movable unit 180 in embodiment 1 according to the present disclosure. FIG. 3A and FIG. 3B are each an isometric view of a magnetic back yoke 670 in the movable unit 180. FIG. 4A is an isometric view of the actuator 165 as seen from a position obliquely above the actuator 165. FIG. 4B is an isometric view of the actuator 165 deprived of a fall-preventive member 201, which is an element, as seen from a position obliquely above the actuator 165. FIG. 4C is an isometric view of the fall-preventive member 201, which is an element, as seen from a position obliquely above fall-preventive member 201. FIG. 5A is a plan view as seen in a direction of a Z-axis 10. FIG. 5B is a view as seen in a direction of a straight line 13 shown in FIG. 5A. FIG. 6 is an isometric view of the actuator 165 deprived of an operation unit 850 and an upper movable unit 150. FIG. 7 is an isometric view of a secured unit as seen from above. FIG. 8A is an exploded isometric view showing a general structure of the secured unit. FIG. 8B is an exploded isometric view showing a structure of one driving unit mounted on the secured unit. FIG. 9A is a plan view of the actuator 165, and FIG. 9B is a cross-sectional view of the actuator 165 taken along a plane including the Z-axis 10 and a rotation axis 11. FIG. 10A is a plan view of the actuator 165, and FIG. 10B is a cross-sectional view of the actuator 165 taken along a plane including the Z-axis 10 and a rotation axis 12. FIG. 11A is a plan view of the actuator 165, and FIG. 11B is a cross-sectional view of the actuator 165 taken along a plane including the Z-axis 10 and the straight line 13. FIG. 12 is an isometric view of the actuator 165 deprived of the fall-preventive member 201 as seen from above, in the state where the actuator 165 is rotated in a rotation direction 20 and a rotation direction 21 at an equal angle, namely, is rotated at synthesis angle θxy. FIG. 13A is a plan view of the actuator 165 deprived of the fall-preventive member 201. FIG. 13B is a cross-sectional view of the actuator 165 deprived of the fall-preventive member 201 taken along a plane including the Z-axis 10 and a straight line 14, in the state where the actuator 165 is rotated in the rotation direction 20 and the rotation direction 21 at an equal angle, namely, is rotated at synthesis angle θxy. FIG. 14A is a plan view of the secured unit, and FIG. 14B is a cross-sectional view of the secured unit taken along a plane including the Z-axis 10 and the rotation axis 11. FIG. 15 is a plan view of a sensor substrate 502 in the actuator 165 as seen from above the Z-axis 10. FIG. 16 shows an overall structure of the input and output operation device 750 in embodiment 1 according to the present disclosure. FIG. 17 is a block diagram showing, in detail, a structure of the input and output operation device 750 in embodiment 1 according to the present disclosure. With reference to these figures, main elements of the actuator 165 and the input and output operation device 750 will be described.

The actuator 165 of the input and output operation device 750 includes the operation unit 850, the movable unit 180 having the operation unit 850 mounted thereon, and the secured unit supporting the movable unit 180.

The movable unit 180 is freely rotatable, with respect to the secured unit, in a rotation direction 22 as centered around the Z-axis 10, in the rotation direction 21 as centered around the rotation axis (X-axis) 11 crossing the Z-axis 10 perpendicularly and passing a spherical center 70, and in the rotation direction 20 as centered around the rotation axis (Y-axis) 12 crossing the Z-axis 10 perpendicularly and passing the spherical center 70. The rotation axis 11 and the rotation axis 12 are perpendicular to each other. Therefore, the actuator 165 includes a first driving unit and a second driving unit that rotate (incline) the movable unit 180 in the rotation direction 20 and the rotation direction 21, and also includes a third driving unit that rotates the operation unit 850 in the rotation direction 22 with respect to the secured unit. Each of the driving units includes a combination of driving magnets, driving coils and magnetic yokes. For example, the driving magnets are provided in the movable unit 180, and the driving coils and the magnetic yokes are provided in the secured unit.

The first driving unit includes a pair of driving magnets 401, a pair of driving coils 301, and a pair of magnetic yokes 203 formed of a magnetic material. Inside the pair of driving coils 301, a pair of driving coils 303 included in the third driving unit that drives the operation unit 850 to rotate in the rotation direction 22 as centered around the Z-axis 10 described below are wound. The driving magnets 401 and the magnetic yokes 203 each have a shape of a part of a cylindrical tube; namely, each have circumferential curved planes centered around the spherical center 70 as two side surfaces.

The second driving unit includes a pair of driving magnets 402, a pair of driving coils 302, and a pair of magnetic yokes 204 formed of a magnetic material. Inside the pair of driving coils 302, a pair of driving coils 303 included in the third driving unit that drives the operation unit 850 to rotate in the rotation direction 22 as centered around the Z-axis 10 described below are wound. The driving magnets 402 and the magnetic yokes 204 also each have a shape of a part of a cylindrical tube; namely, each have circumferential curved planes centered around the spherical center 70 as two side surfaces.

The movable unit 180 is driven by the first, second and third driving units as described below in detail.

The actuator 165 includes a detector that detects a rotation angle, with respect to the secured unit, of the movable unit 180 having the operation unit 850 mounted thereon and also detects a rotation angle of the movable unit 180 around the Z-axis 10. Specifically, the actuator 165 includes a first detection unit that detects a two-dimensional rotation (inclination) angle of the movable unit 180, namely, a rotation angle in the rotation direction 20 and a rotation angle in the rotation direction 21, and also includes a second detection unit that detects an inclination angle of the movable unit 180 in the rotation direction 22. The second detection unit, which is not shown, includes a pair of rotation detection magnets located at two ends of the movable unit 180 as centered around the spherical center 70 on a plane perpendicular to the Z-axis 10, and also includes a pair of magnetic sensors located on a base 200 so as to face the rotation detection magnets. In the case where the input and output operation device 750 is merely required to detect whether the rotation in the rotation direction 22 is made in a positive direction or a negative direction as in the embodiment according to the present disclosure, such a detection is properly made merely by the first detection unit, and the second detection unit is not needed.

The first detection unit includes a rotation detection magnet 406 mounted on a bottom part of the movable unit 180, a pair of magnetic sensors 501a and 501b that are parallel to the straight line 13 passing the spherical center 70 and crossing the rotation axes 11 and 12 perpendicularly on a plane including the rotation axes 11 and 12 and are located as centered around the Z-axis 10, and a pair of magnetic sensors 503a and 503b that are parallel to the straight line 14 passing the spherical center 70 and crossing the straight line 13 perpendicularly on the plane including the rotation axes 11 and 12 and are located as centered around the Z-axis 10. The magnetic sensors 501a, 501b, 503a and 503b are mounted on the sensor substrate 502 and secured to the base 200 via a coil spring 600 while being away from the rotation detection magnet 406 by a predetermined gap. The detector will be described below in detail.

The secured unit includes the base 200. The base 200 has a concaved portion with which at least a part of the movable unit 180 is loosely engageable. In this embodiment, an inner surface of the concaved portion is formed of a concaved spherical surface 200A. The base 200 further includes openings 200P and 200T and a contact surface 200B.

As shown in FIG. 1, the actuator 165 uses the pair of magnetic yokes 203 and the pair of magnetic yokes 204, the four driving coils 303 wound around the magnetic yokes 203 and 204, and the pair of driving magnets 401 and the pair of driving magnets 402 to rotate the movable unit 180 in the rotation direction 22.

As shown in FIG. 1, FIG. 8A and FIG. 8B, the driving coils 303 are wound around the pair of magnetic yokes 203 and the pair of magnetic yokes 204. The winding direction of the driving coils 303 is perpendicular to the winding direction of the driving coils 301 and 302. Thus, the driving coils 303 and the driving coils 301 and 302 form a cross-winding structure. The driving coils 303 are inserted into the openings 200P and 200T of the base 200 and secured therein. Specifically, the driving coils 303 are wound around the pair of magnetic yokes 203 and the pair of magnetic yokes 204. Then, magnetic yoke holders 203L and 203R are secured to side surfaces of each of the pair of magnetic yokes 203, and magnetic yoke holders 204L and 204R are secured to side surfaces of each of the pair of magnetic yokes 204. After this, the pair of driving coils 301 and the pair of driving coils 302 are respectively wound around the resultant assemblies. Bottom parts of the magnetic yoke holders 203L and 203R and the magnetic yoke holders 204L and 204R are secured to an attachment surface 200S of the base 200. Thus, the driving unit is mounted on the secured unit.

Preferably, the secured unit including the base 200 is formed of a resin. More preferably, the secured unit including the base 200 is integrally molded with the driving coils 301 and the driving coils 303 wound around the pair of magnetic yokes 203, and the driving coils 302 and the driving coils 303 wound around the pair of magnetic yokes 204. Preferably, the driving coils wound around the magnetic yokes are not exposed on an inner side surface of the base 200, namely, the concaved spherical surface 200A.

The movable unit 180 includes the upper movable unit 150 and a lower movable unit 102. The upper movable unit 150 having the operation unit 850 built therein is secured to the lower movable unit 102. The operation unit 850 mounted on the movable unit 180 is located on the Z-axis 10. The operation unit 850 generally has a convexed shape, and a center of the convexed shape (part convexed most) positionally matches the Z-axis 10. The movable unit 180 is not provided with a camera, a light emitting element or the like.

The lower movable unit 102 has a vase shape including a pair of openings 102W. The lower movable unit 102 includes, as an outer surface, a convexed spherical surface 102R centered around the spherical center 70.

The convexed spherical surface 102R covers the entirety of the lower movable unit 102. More specifically, the lower movable unit 102 has the pair of openings 102W, into which a coupling rod 650 is insertable. The coupling rod 650 couples and secures a convexed spherical portion 651 centered around the spherical center 70 described below to the base 200. The openings 102W are each formed in the lower movable unit 102 with a position and a size with which the coupling rod 650 does not contact the lower movable unit 102 when the movable unit 180 rotates as centered around the Z-axis 10, the rotation axis 11 and the rotation axis 12 at a preset angle range. The openings 102W are used as stoppers against the rotation of the movable unit 180 in the rotation direction 22. With such a structure, a surface of the lower movable unit 102 other than the openings 102W forms the convexed spherical surface 102R.

The spherical center 70 of the convexed spherical portion 651 and the convexed spherical surface 102R is located at a center of the lower movable unit 102 and below the operation unit 850.

The movable unit 180 has the rotation detection magnet 406, the pair of driving magnets 401 and pair of driving magnets 402 provided therein. Preferably, the detection magnet and the driving magnets provided in the movable unit 180 are inserted through an opening 102H and located inside the lower movable unit 102 so as not to be exposed on the convexed spherical surface 102R. Preferably, the lower movable unit 102 is formed of a resin, and the lower movable unit 102, the rotation detection magnet 406, the pair of driving magnets 401 and the pair of driving magnets 402 are integrally formed.

Referring to FIG. 9B and FIG. 10B, the magnetic yokes 203 and the magnetic yokes 204 provided inside the base 200 are formed of a magnetic material. Therefore, the driving magnets 401 and the driving magnets 402 provided inside the lower movable unit 102 so as to face each other act as attraction magnets, and a magnetic attraction force is generated between the magnetic yokes and the driving magnets. Specifically, a magnetic attraction force F1 is generated between the magnetic yokes 203 and the driving magnets 401, and a magnetic attraction force F1 is generated between the magnetic yokes 204 and the driving magnets 402. In actuality, central lines 18 of the magnetic yokes 203 and the driving magnets 401, and central lines 19 of the magnetic yokes 204 and the driving magnets 402, are respectively inclined downward at inclination angle θd with respect to the straight line 11 and the straight line 12. The inclination angle θd is preferably 15 to 25 degrees. The upper movable unit 150 has a vase shape and has openings corresponding to the openings of the vase shape of the lower movable unit 102. The lower movable unit 102 includes, as an outer surface, a convexed spherical surface 102R centered around the spherical center 70. Inside the vase-shaped upper movable unit 150, a concaved conical member 860 including the concaved conical surface 860a is located. The concaved conical surface 860a faces the lower movable unit 102 and is in contact with a convexed spherical surface 651a of the convexed spherical portion 651 of the secured unit. With such a structure, the movable unit 180 is loosely engageable with the secured unit.

As shown in FIG. 9B, each magnetic attraction force F1 is a normal force of the convexed spherical portion 651 of the secured unit to the concaved conical member 860. The magnetic attraction forces F1 form a magnetic attraction force F2, which is a synthesized vector in the direction of the Z-axis 10. The balance between these forces is similar to the kinetic structure of a so-called balance toy. For this reason, the movable unit 180 is rotatable around the three-axial directions very stably. Specifically, the movable unit 180 is pivotably supported to the secured unit at a position in the vicinity of the spherical center 70. This support is highly stable with little frictional resistance, and therefore, realizes a highly superb dynamic characteristic. Namely, the movable unit 180 is made rotatable in the rotation directions 22, 21 and 20 as centered around the Z-axis 10, the rotation axis 11 and the rotation axis 12.

Especially because the movable unit 180 has a spherical shape including the upper movable unit 150 and the lower movable unit 102, the spherical center 70 is matched to the center and the center of gravity of the movable unit 180. Therefore, the movable unit 180 is rotatable at substantially the same moment in the rotation direction 20, the rotation direction 21 and the rotation direction 22. As a result, the movable unit 180 is constantly rotatable at substantially the same driving force regardless of the manner of rotation in the rotation direction 20, the rotation direction 21 and the rotation direction 22. The movable unit 180 is constantly driven at high precision.

The spherical center 70, namely, the rotation center of the movable unit 180 is matched to the center of gravity of the movable unit 180. Therefore, the movable unit 180 is rotatable in the rotation direction 20, the rotation direction 21 and the rotation direction 22 at a very small moment. This allows the movable unit 180 to be maintained in a neutral state or to be rotated in the rotation direction 20, the rotation direction 21 and the rotation direction 22 by a small driving force. This decreases the power consumption of the actuator 165 of the input and output operation device 750. Especially, the driving current required to maintain the movable unit 180 in the neutral state is made almost zero.

As described above, in this embodiment, the movable unit 180 having the operation unit 850 mounted thereon is supported in a concentrated manner at the spherical center 70, which is the center of gravity. This significantly decreases the load caused by friction and significantly suppresses the mechanical resonance in a driving frequency range.

The driving magnets 401 and the driving magnets 402 have a partial circumferential curved surface and thus generate the magnetic attraction force F2 having a constant level regardless of whether the rotation angle is large or small. Therefore, the normal force of the convexed spherical portion 651 of the secured unit to the concaved conical member 860 is constant. As a result, the frictional load is suppressed from being changed in accordance with the rotation angle, and a good phase gain characteristic is realized in the driving frequency range.

In the case where the convexed spherical portion 651 or the concaved conical member 860 is formed of a highly slippery resin, the friction between the concaved conical surface 860a and convexed spherical surface 651a in contact with each other is further decreased. This realizes a highly abrasion-resistant support structure.

The actuator 165 preferably includes the fall-preventive member 201 that restricts the movement of the movable unit 180 so as to prevent the movable unit 180 from falling from the secured unit (FIG. 1, FIG. 4A, FIG. 4C). The fall-preventive member 201 includes a fall-preventive restriction surface 201A. When the movable unit 180 is moved away from the secured unit, the upper movable unit 150 of the movable unit 180 and the fall-preventive restriction surface 201A contact each other, and thus the movement of the movable unit 180 is restricted (FIG. &A).

The convexed spherical surface 150R of the upper movable unit 150 and the fall-preventive restriction surface 201A of the fall-preventive member 201 have a predetermined gap (not shown) therebetween so as to allow the upper movable unit 150 to be freely rotatable with respect to the spherical center 70 in the entire moving range thereof.

Preferably, the fall-preventive restriction surface 201A has a concaved partial spherical surface, a center of which is matched to the spherical center 70. The fall-preventive member 201 is secured to the contact surface 200B of the base 200. The convexed spherical surface 150R and the fall-preventive restriction surface 201A have a gap therebetween in the state where the concaved conical surface 860a of the concaved conical member 860 is in contact with the convexed spherical surface 651a of the convexed spherical portion 651 of the secured unit. This gap is set to have a size with even if the concaved conical surface 860a is separated from the convexed spherical surface 651a, the concaved conical surface 860a and the convexed spherical surface 651a are returned to a state of being in contact with each other by the magnetic attraction force F1. Namely, even if the movable unit 180 is moved upward by a distance equal to the size of the gap and as a result, the fall-preventive restriction surface 201A and the convexed spherical surface 150R contact each other, the movable unit 180 is returned by the magnetic attraction force F1 to the original state in which the concaved conical surface 860a and the convexed spherical surface 651a are in contact with each other. Therefore, the input and output operation device in this embodiment has a superb impact resistance with which the movable unit 180, even if falling from a predetermined position instantaneously, is returned to the original state of being well supported promptly by the magnetic attraction force F1.

Now, a structure for driving the movable unit 180 of the actuator 165 will be described in detail.

As shown in FIG. 2, in the lower movable unit 102, the pair of driving magnets 401 are located symmetrically with respect to the Z-axis 10 in order to drive the movable unit 180 to rotate in the rotation direction 20, and the pair of driving magnets 402 are located symmetrically with respect to the Z-axis 10 in order to drive the movable unit 180 to rotate in the rotation direction 21. The "Z-axis 10" in the expression "symmetrically with respect to the Z-axis 10" used for the elements included in the secured unit refers to the Z-axis 10 in the state where the movable unit 180 is in the neutral state, namely, in the state where the movable unit 180 is not rotated with respect to the secured unit.

The driving magnets 401 are magnetized to one pole so as to have a magnetic flux in a direction of the rotation axis 11. Similarly, the driving magnets 402 are magnetized to one pole so as to have a magnetic flux in a direction of the rotation axis 12.

As shown in FIG. 1, FIG. 9B and FIG. 10B and as described above, the pair of magnetic yokes 203 and the pair of magnetic yokes 204 are provided on a circumference of the base 200 centered around the Z-axis 10 so as to respectively face the pair of driving magnets 401 and the pair of driving magnets 402.

As shown in FIG. 1 and FIG. 8A, the pair of magnetic yokes 203 located on the base 200 in the direction of the rotation axis 11 are respectively wound around by the driving coils 303. Outside the driving coils 303, the driving coils 301 each divided into four and wound in a direction perpendicular to the winding direction of the driving coils 303 are provided. A reason why the driving coils 303 are each divided into four is that the magnetic yokes 203 each have a circumferential curved surface.

Similarly, the pair of magnetic yokes 204 located in the direction of the rotation axis 12 perpendicular to the rotation axis 11 are respectively wound around by the driving coils 303. Outside the driving coils 303, the driving coils 302 wound in a direction perpendicular to the winding direction of the driving coils 303 are provided.

In other words, the driving units for the rotation direction 20, the rotation direction 21 and rotation direction 22 are located independently in a dispersed manner on a circumference centered around the Z-axis 10.

With such a structure, as shown in FIG. 9B and FIG. 10B, magnetic gaps between the magnetic yokes 203 and the driving magnets 401, and magnetic gaps between the magnetic yokes 204 and the driving magnets 402, are provided uniformly. Therefore, magnetic flux densities of the magnetic yokes 203 and 204 and the driving magnets 401 and 402 are improved uniformly, and thus the driving efficiency in the rotation direction 20, the rotation direction 21 and rotation direction 22 is significantly improved.

Now, the height position of each driving unit on the Z-axis 10 will be described.

As shown in FIG. 143, straight lines 36 and 37 are vertical to the central axis (not shown), passing the aspherical center 70, of the circumferential curved surface of the magnetic yokes 203 secured to the base 200. The straight lines 36 and 37 are also vertical to the central axis (not shown), passing the aspherical center 70, of the circumferential curved surface of the driving magnets 401 provided in the movable unit in the neutral state. The straight lines 36 and 37 are each inclined downward at inclination angle θp with respect to the straight line 11. The inclination angle θp is 45 degrees or smaller. Although not shown, the magnetic yokes 204 secured to the base 200 and the driving magnets 402 have substantially the same structure. As described above, the pairs of driving magnets 401 and 402 and the pairs of magnetic yokes 203 and 204 are structured as four petals that are inclined downward at inclination angle θp, which is 45 degrees or smaller, with respect to a horizontal plane including the spherical center 70 and are centered around the Z-axis 10. Specifically, as shown in FIG. 14A and FIG. 14B, the side surfaces of each of the pair of magnetic yokes 203 are held between the magnetic yoke holders 203L and 203R, and bottom parts of the magnetic yoke holders 203L and 203R are inserted into the opening 200P of the base 200. With such a structure, the magnetic yokes 203 are secured to the attachment surface 200S.

Similarly, the side surfaces of each of the pair of magnetic yokes 204 are held between the magnetic yoke holders 204L and 204R, and bottom parts of the magnetic yoke holders 204L and 204R are inserted into the opening 200T of the base 200. With such a structure, the magnetic yokes 204 are secured to the attachment surface 200S.

As described above, since the inclination angle θp is set to 45 degrees or smaller, the height of the secured unit is made low, which decreases the size of installation space for, and the height of, the device. The rotation inclination angle θp and the rotation inclination angle θd are each preferably about 15 degrees to 25 degrees, or more preferably, for example, 20 degrees.

When the pair of driving coils 301 are provided with electric charge, the pair of driving magnets 401 receive couple of electromagnetic forces. As a result, the lower movable unit 102, namely, the movable unit 180 is driven to rotate in the rotation direction 20 as centered around the rotation axis 12 extending in the direction of the X-axis. Similarly, when the pair of driving coils 302 are provided with electric charge, the pair of driving magnets 402 receive couple of electromagnetic forces. As a result, the movable unit 180 is driven to rotate in the rotation direction 21 as centered around the rotation axis 11 extending in the direction of the Y-axis.

When the driving coils 301 and the driving coils 302 are provided with electric charge at the same time, the movable unit 180 having the operation unit 850 mounted thereon is rotated two-dimensionally.

FIG. 12, FIG. 13A and FIG. 13B shows the following state. When the driving coils 301 and the driving coils 302 are provided with electric charge at the same time, the movable unit 180 is rotated in the rotation direction 20 and the rotation direction 21 at the same angle, and as a result, the movable unit 180 is rotated at synthesis angle θxy in a direction of the straight line 13 making an angle of 45 degrees with respect to the rotation direction 20 and the rotation direction 21.

When the four driving coils 303 are provided with electric charge, the movable unit 180 receives an electromagnetic force in the same rotation direction. As a result, the movable unit 180 is driven to rotate in the rotation direction 22 as centered around the Z-axis 10.

When the four driving coils 303 are provided with electric charge in the state where the movable unit 180 is rotated at synthesis angle θxy, the movable unit 180 is driven to rotate in a rotation direction 23 as centered around a straight line 32.

As described above, this embodiment adopts a moving magnet driving system, in which the driving magnets 401 and the driving magnets 402 are provided in the movable unit 180. Generally with this structure, a problem is conceivable that the weight of the movable unit 180 is increased. However, this structure makes it unnecessary to suspend lines for driving to the movable unit 180.

The center of gravity of the movable unit 180 and the rotation center of the movable unit 180 match the spherical center 70. Therefore, even if the weight of the movable unit 180 is increased because of the driving magnets, the torque of the movable unit 180 is not significantly increased. For this reason, in this embodiment, the advantages of the moving magnet driving system are enjoyed while the problem caused by the increase in the weight is suppressed.

The rotation angle of the movable unit 180 in the rotation direction 22 centered around the Z-axis 10 is restricted by the contact of the pair of openings 102W formed in the lower movable unit 102 and the coupling rod 650 secured to the base 200. Since the coupling rod 650 is inserted into the pair of openings 102W, the movable unit 180 is rotatable as centered around the Z-axis 10 in the opening range defined by the openings 102W, without the coupling rod 650 contacting walls that define the openings 102W. When the movable unit 180 attempts to rotate to an area outside the opening range, the coupling rod 650 contacts the walls that define the pair of openings 102W. Therefore, the movable unit 180 is not allowed to rotate furthermore.

The moving magnet driving system has a great advantage that heat generated in the driving coils 301, the driving coils 302 and the driving coils 303 is cooled by the base 200 via the magnetic yokes 203, the magnetic yoke holders 203L and 203R, the magnetic yokes 204, and the magnetic yoke holders 204L and 204R. In the case where the rotation angles in the rotation direction 20 and the rotation direction 21 are designed to be 20 degrees or larger, the moving magnet driving system is advantageous because the movable unit 180 is made compact and lightweight. By contrast, a moving coil driving system has a possibility that the driving coils are excessively enlarged and the weight of the movable unit 180 is increased.

As described above, in this embodiment, the operation unit 850 mounted on the movable unit 180, the upper movable unit 150, the lower movable unit 102, the rotation detection magnet 406, the fall-preventive restriction surface 201A provided in the secured unit, the two pairs of rotation driving units provided on the base 200 are all structured such that the central axes thereof pass the spherical center 70, which is the center of support and also the center of driving.

Therefore, the center of gravity of the movable unit 180 matches the spherical center 70, and the movable unit 180 is supported at the center of gravity. In addition, the movable unit 180 is driven to rotate as centered around three axes that pass the center of gravity and are perpendicular to one another. The movable unit 180 is prevented from falling.

The actuator 165 of the input and output operation device 750 may include a viscous member (not shown) in order to decrease the amplitude enhancement factor (Q factor) of the movable unit 180. In this case, as shown in FIG. 9B and FIG. 10B, the viscous member is provided between the concaved conical surface 860a of the concaved conical member 860 mounted on the upper movable unit 150 and the convexed spherical surface 651a of the convexed spherical portion 651 of the secured unit. Such a structure decreases the amplitude enhancement factor (Q factor) of vibrations or the Q factor of mechanical inherent vibrations, which are caused by a magnetic spring effect that is caused by a change in the magnetic attraction force generated in accordance with the rotation angles in the rotation directions 21 and 22 and by the rotation angle in the rotation direction 22 between the driving magnets 401 and the driving magnets 402 provided in the movable unit 180 and the magnetic yokes 203 and the magnetic yokes 204 provided on the base 200, thereby providing a good control characteristic.

Now, detection of the rotation angles (inclination angles) of the movable unit 180 will be described. As shown in FIG. 1, FIG. 2, FIG. 11A, FIG. 113 and FIG. 15, the actuator 165 includes the detector that detects the rotation angles of the movable unit 180, having the operation unit 850 mounted thereon, with respect to the secured unit and the rotation angle around the Z-axis 10.

Specifically, the actuator 165 includes the first detection unit that detects the two-dimensional rotation angle of the movable unit 180, namely, the rotation angles of the movable unit 180 in the rotation direction 20 and the rotation direction 21, and also includes the second detection unit that detects the rotation angle of the movable unit 180 in the rotation direction 22.

The second detection unit, although not shown, includes a pair of rotation detection magnets located at two ends of the movable unit 180 as centered around the spherical center 70 on a plane perpendicular to the Z-axis 10 and a pair of magnetic sensors located on the base 200 so as to face the rotation detection magnets.

In the case where the input and output operation device 750 is merely required to detect whether the rotation in the rotation direction 22 is made in a positive direction or a negative direction as in the embodiment according to the present disclosure, such a detection is properly made merely by the first detection unit, and the second detection unit is not needed.

The first detection unit includes the rotation detection magnet 406 mounted on a bottom part of the movable unit 180, the pair of magnetic sensors 501a and 501b that are parallel to the straight line 13 passing the spherical center 70 and crossing the rotation axes 11 and 12 perpendicularly on a plane including the rotation axes 11 and 12 and are located as centered around the Z-axis 10, and the pair of magnetic sensors 503a and 503b that are parallel to the straight line 14 passing the spherical center 70 and crossing the straight line 13 perpendicularly on the plane including the rotation axes 11 and 12 and are located as centered around the Z-axis 10.

The magnetic sensors 501a, 501b, 503a and 503b are mounted on the sensor substrate 502 and secured to a bottom part of the base 200 via the coil spring 600 while being away from the rotation detection magnet 406 by a predetermined gap.

First, detection of the rotation angles of the movable unit 180 in the rotation direction 20 and the rotation direction 21 will be described in detail.

The sensor substrate 502 is secured to the base 200 by adjusting screws (not shown) 601 via the coil spring 600 at three positions. The three adjusting screws 601 are rotated to change the relative inclination and the distance between the rotation detection magnet 406 and the pair of magnetic sensors 501a and 501b and also between the rotation detection magnet 406 and the pair of magnetic sensors 503a and 503b. As a result, inclination output signals of the magnetic sensors 501a and 501b and the magnetic sensors 503a and 503b are adjusted to be optimal.

As shown in FIG. 11B, FIG. 13A and FIG. 13B, the magnetic sensors 501a and 501b are located parallel to the straight line 13, and the magnetic sensors 503a and 503b are located parallel to the straight line 14, so as not to be influenced by a magnetic field generated by driving currents in the driving coils 301 and the driving coils 302. The magnetic sensors 501a and 501b located parallel to the straight line 13 detect, as a synthesized two-axial component, a change in the magnetic force of the rotation detection magnet 406 caused by the rotation operation of the movable unit 180 in the rotation direction 20 and the rotation direction 21. In addition, differential detection on the outputs detected by the magnetic sensors 501a and 501b is performed to improve the S/N ratio of the detection signals.

The magnetic sensors 503a and 503b located parallel to the straight line 14 detect, as a synthesized two-axial component, a change in the magnetic force of the rotation detection magnet 406 caused by the rotation operation of the movable unit 180 in the rotation direction 20 and the rotation direction 21. In addition, differential detection on the outputs detected by the magnetic sensors 503a and 503b is performed to improve the S/N ratio of the detection signals.

In the case where the input and output operation device 750 is merely required to detect whether the rotation in the rotation direction 22 is made in a positive direction or a negative direction as in this embodiment, such a detection is made possible by differential detection on the magnetic sensors 501a and 503b and differential detection on the magnetic sensors 501b and 503a.

As described above, in this embodiment, the distance between the rotation detection magnet 406 and the spherical center 70 is shortened, and thus the moving distance of the rotation detection magnet 406 with respect to the rotation angle is shortened. This decreases the area size of a projection region of each of the magnetic sensors 501a and 501b and the magnetic sensors 503a and 503b.

In this embodiment, the detector includes the magnetic sensors 501a and 501b, the magnetic sensors 503a and 503b, and the rotation detection magnet 406. Alternatively, the detector may include any other element. For example, the detector may include, on the Z-axis 10, an optical sensor provided in the secured unit and an optical detection pattern provided in the movable unit 180. The movable unit is rotated to rotate the optical detection pattern, and thus light incident on the optical sensor is changed. The optical sensor may detect this change in the light to calculate a two-dimensional rotation angle.

As described above, in the actuator 165 of the input and output operation device 750 in this embodiment, the structure that pivotably supports the movable unit at the spherical center is located on the Z-axis of the operation unit, and the two pairs of driving units are located, as centered around the spherical center, on the circumference of the plane that is vertical to the Z-axis and passes the spherical center. With such a structure, a normal force of a constant level is provided by a magnetic attraction force that is not easily influenced by the pivoting angle of the movable unit, and thus the change in the frictional load caused by the rotation angle is decreased. In addition, the movable unit is supported and driven at the center of gravity. As a result, the mechanical resonance is significantly suppressed in the driving frequency range.

Conventionally, there is a serious problem, specific to a support structure using a magnetic attraction force, that the movable unit 180 may fall by an external disturbance such as vibration, impact or the like. The fall-preventive member provided in the secured unit in order to prevent this problem includes the fall-preventive restriction surface via a predetermined gap in which the movable unit 180 is pivotable. Therefore, the fall of the movable unit is prevented with certainty while the device is prevented from being enlarged.

The position of the fall-preventive restriction surface is determined such that even if the movable unit falls to have the convexed spherical surface thereof contact the fall-preventive restriction surface in the secured unit, the convexed spherical surface in the secured unit and the concaved conical member of the movable unit are returned to a state of point-contacting each other by a magnetic attraction force. Therefore, the input and output operation device has a superb impact resistance with which the movable unit, even if falling instantaneously, is returned to the original state of being well supported promptly.

Regarding the height position of the driving units on the Z-axis, the driving units are located as being rotated downward with respect to the horizontal plane including the spherical center. Therefore, the movable unit is driven at the center of gravity, which is the spherical center, and also the height of the device is made low.

The movable unit and the base may be formed of a resin material, or the convexed spherical surface of the secured unit and the surface of the concaved conical member may be covered with a resin member. In this case, the support structure provides little friction and is highly abrasion-resistant.

The gap between the concaved conical surface of the upper movable unit and the convexed spherical surface of the secured unit may be filled with the viscous member. In this case, the amplitude enhancement factor (Q factor) of vibrations or the Q factor of mechanical inherent vibrations, which are caused by a magnetic spring effect caused by a change in the magnetic attraction force generated between the driving magnets provided in the movable unit and the magnetic yokes provided in the secured unit, are decreased, and thus a good control characteristic is provided.

Therefore, the actuator of the input and output operation device in this embodiment rotates the movable unit at a large angle of ±20 degrees around, for example, the X-axis and the Y-axis perpendicular to each other, and also rotates the movable unit at a large angle of ±5 degrees around the Z-axis perpendicular to the X-axis and the Y-axis. In addition, a good correction control is realized in a broadband frequency range up to about 200 Hz. As a result, the actuator of the input and output operation device realizes the rotation operation of the operation unit around the X-axis, the Y-axis and the X-axis. The actuator of the input and output operation device includes a compact and solid fall-preventive structure, and therefore, has a high impact resistance against an external impact such as vibration, impact at the time of falling or the like.

Now, with reference to FIG. 16 and FIG. 17, an operation of the input and output operation device 750 including the actuator 165 in embodiment 1 will be described.

As shown in FIG. 16, the input and output operation device 750 in embodiment 1 according to the present disclosure includes the actuator 165, a driving circuit unit 350, a detection circuit unit 360, and a control computation processing unit 94. The input and output operation device 750 may also include a display computation processing unit 700 displaying a target position coordinate pair of the actuator 165.

The operation unit 850, of the actuator 165 of the input and output operation device 750, which is in contact with a finger, may be allowed to track the position of a target position coordinate pair 920 displayed on the display computation processing unit 700. FIG. 17 is a block diagram showing the control performed by the input and output operation device 750 in detail.

As shown in FIG. 17, the driving circuit unit 350 includes driving circuits 96a, 96b and 96r. The detection circuit unit 360 includes amplification circuits 98x and 98y for the movable unit 180.

Specifically, an x coordinate 900 and a y coordinate 901 of the target position coordinate pair 920 displayed on the display computation processing unit 700 respectively correspond to target rotation angles of the movable unit 180 in the rotation direction 20 and the rotation direction 21.

As shown in FIG. 16, the rotation axis 11 and the rotation axis 12 of the actuator 165 are inclined at 45 degrees with respect to a horizontal reference HS in the display computation processing unit 700. A reason for this is as follows. As described above, in a projection plane as seen in the direction of the Z-axis, the magnetic sensors 501a and 501b are located in a region other than (in this embodiment, are located as inclined by 45 degrees with respect to) the projection region of the driving coils 301 and the magnetic yokes 203, and the magnetic yoke holders 203L and 203R. Similarly, the magnetic sensors 503a and 503b are located in a region other than (in this embodiment, are located as inclined by 45 degrees with respect to) the projection region of the driving coils 302 and the magnetic yokes 204, and the magnetic yoke holders 204L and 204R. In this manner, neither the magnetic sensors 501a and 501b nor the magnetic sensors 503a and 503b, are influenced by the magnetic field generated by the driving currents in the driving coils 301 and the driving coils 302. Therefore, in the case where the movable unit 180 is to be rotated around the straight line 14, which is the direction of the horizontal plane HS in the display computation processing unit 700, both of the driving coils 301 and the driving coils 302 are provided with electric charge. Thus, the movable unit 180 is driven to be rotate around the straight line 14 (corresponding to the direction of the X-axis in the display computation processing unit 700). Also in the case where the movable unit 180 is to be rotated around the straight line 13, which is vertical to the horizontal plane HS, both of the driving coils 301 and the driving coils 302 are provided with electric charge. Thus, the movable unit 180 is driven to rotate around the straight line 13 (corresponding to the direction of the Y-axis in the display computation processing unit 700).

As a result, in the case where driving coils 301 and the driving coils 302 rotated at 45 degrees are to be driven to cause the movable unit 180 to reach the x coordinate 900 and the y coordinate 901 of the position coordinate pair 920 of $\theta g=45°$ in the display computation processing unit 700 shown in FIG. 16, the rotation angle of the movable unit 180 around the rotation axis 12 and the rotation axis 11 is $1/\sqrt{2}$ times.

Now, with reference to FIG. 17, an operation of controlling position signals on the movable unit 180, which are output from the display computation processing unit 700 to the actuator 165 via the control computation processing unit 94, will be described.

As shown in FIG. 17, the x coordinate 900 and the y coordinate 901 of the target position coordinate pair 920 in the display computation processing unit 700 are respectively output as digitized target position coordinate signals 80$x$ and 80$y$ and are input to the control computation processing unit 94.

The control computation processing unit 94 generates target rotation angle signals 84$a$ and 84$b$ based on the target position coordinate signals 80$x$ and 80$y$ received from the display computation processing unit 700 and rotation angle signals 88$x$ and 88$y$ received from the detection circuit unit 360, and performs a feedback control on the angles around the rotation axes 11 and 12. Specifically, the control computation processing unit 94 first executes a process of converting the target position coordinate pair into the rotation angles of the actuator 165. In this process, correction is also made by the magnetic sensors 501$a$ and 501$b$ and the magnetic sensors 503$a$ and 503$b$ being respectively shifted at 45 degrees on the projection plane with respect to the driving coils 301 and the driving coils 302. As a result, the target rotation angles in the rotation direction 20 and the rotation direction 21 corresponding to the x coordinate 900 and the y coordinate 901 are calculated sequentially.

A position shift correction process to the target position executed by the control computation processing unit 94 is a position closed control of driving the movable unit 180 of the actuator 165 such that positional errors are suppressed in accordance with the target position coordinate signals 80$x$ and 80$y$ for the x coordinate 900 and the y coordinate 901 that are output from the display computation processing unit 700. Therefore, the control computation processing unit 94 sequentially output the target rotation angle signals 84$a$ and 84$b$ as optimal digital shake correction amounts including a frequency response characteristic, phase compensation, gain correction and the like for the actuator 165.

The target rotation angle signals 84$a$ and 84$b$ are converted into analog signals by D/A converters 95$a$ and 95$b$ and are input to the driving circuit 96$a$ for the rotation axis 11 and the driving circuit 96$b$ for the rotation axis 12 as analog target rotation angle signals 85$a$ and 85$b$.

In the meantime, in the actuator 165, a rotation angle signal 86$y$ corresponding to a rotation in the rotation direction 20, namely, a y-axis direction vertical to the horizontal reference HS in the display computation processing unit 700 is output from the magnetic sensors 501$a$ and 501$b$ that detect the rotation angle of the movable unit 180 with respect to the base 200, and a rotation angle signal 86$x$ corresponding to a rotation in the rotation direction 21, namely, the direction of the horizontal reference HS in the display computation processing unit 700 is output from the magnetic sensors 503$a$ and 503$b$. The rotation angle signals 86$x$ and 86$y$ have a noise component or a DC drift component removed by analog circuits 97$x$ and 97$y$ to become rotation angle signals 87$x$ and 87$y$. The rotation angle signals 87$x$ and 87$y$ are amplified by the amplification circuits 98$x$ and 98$y$. As a result, rotation angle signals 88$x$ and 88$y$ having an appropriate amplitude are obtained. The rotation angle signals 88$x$ and 88$y$ are digitized by A/D converters 99$x$ and 99$y$ into rotation angle signals 89$x$ and 89$y$, which are sequentially input to the control computation processing unit 94.

The position closed control described above is performed as follows. The control computation processing unit 94 calculates a difference (positional error) between the target position coordinate pair 920 represented by the target position coordinate signals 80$x$ and 80$y$ and a current position coordinate pair represented by the rotation angle signals 89$x$ and 89$y$ on the movable unit 180, and sequentially outputs the target rotation angle signals 84$a$ and 84$b$ generated based on the positional error.

The control computation processing unit 94 performs a reverse conversion computation on the rotation angle signals 89$x$ and 89$y$ on the movable unit 180 into signals in a position coordinate system displayed on the display computation processing unit 700, and outputs the resultant signals as feedback position coordinate signals 82$x$ and 82$y$ to the display computation processing unit 700.

The driving circuits 96$a$ and 96$b$ are controlled by a feedback system that feeds back the rotation angle signals 89$x$ and 89$y$ to the target rotation angle signals 85$a$ and 85$b$. Therefore, in the case where no external force by a finger acts on the movable unit 180, the rotation angles of the movable unit 180 in the rotation direction 20 and the rotation direction 21 are controlled to be predetermined rotation angles.

Therefore, driving signals usable to drive the driving coils 301 and the driving coils 302 are output to the driving circuits 96$a$ and 96$b$ based on the target position coordinate signals 80$x$ and 80$y$ for the display computation processing unit 700, the target rotation angle signals 85$a$ and 85$b$, and the rotation angle signals 89$x$ and 89$y$ on the movable unit 180. As a result, the input and output operation device 750 performs a feedback control on the angular position with respect to the target position coordinate pair 920, and the movable unit 180 of the actuator 165 is driven such that the feedback position coordinate signals 82$x$ and 82$y$ are matched to the target position coordinate signals 80$x$ and 80$y$. This series of driving controls result in a position tracking control performed on the operation unit 850 mounted on the movable unit 180. Thus, a good haptic operation is realized.

Now, with reference to FIG. 17, an operation of controlling driving signals usable to rotate the movable unit 180 in the rotation direction 22, which are output from the display computation processing unit 700 to the actuator 165 will be described.

The movable unit 180 is also driven in the rotation direction 22 around the Z-axis 10. This operation mainly includes a vibration of the movable unit 180 caused by a driving signal having the pattern of a sine waveform, a rectangular waveform, a pulse waveform, a triangular waveform or the like. In this embodiment, this operation is based on an open control.

The control computation processing unit 94 generates a driving signal 94*r* having a predetermined driving waveform pattern based a selection signal 80*r* received from the display computation processing unit 700 and drives the movable unit 180 to vibrate around the Z-axis 10. For this purpose, the control computation processing unit 94 has stored thereon various driving waveform patterns each providing a predetermined vibration mode. The driving waveform patterns include a driving waveform pattern having a high frequency characteristic that is considered to be suitable to present a haptic operation function and is represented as a "stick and slip" or "click".

The display computation processing unit 700 outputs the selection signal 80*r* usable to select a driving waveform pattern to the control computation processing unit 94. The control computation processing unit 94 selects a predetermined driving waveform pattern based on the selection signal 80*r* and outputs a digitized driving signal 84*r* to a D/A converter 95*r*. The driving signal 84*r* is converted into an analog driving signal 85*r*, which is input to the driving circuit 96*r* for the rotation direction 22. As a result, the movable unit 180 is driven to vibrate in the rotation direction 22, and thus provides a finger tip of the operator via the operation unit 850 with a sense of vibration or a haptic sense, which stimulates the Pacinian corpuscles inside the finger tip.

The vibration of the movable unit 180 in the rotation direction 22 is, as seen from above the movable unit 180, includes, for example, a repetition of a rightward rotation around the Z-axis 10 at a predetermined angle and a reverse, namely, leftward rotation around the Z-axis 10 at a predetermined angle.

The movable unit 180 may be driven to rotate in the rotation direction 22 by a driving signal including a frequency component in an audible range, instead of being driven to vibrate as described above. In this case, the movable unit 180 vibrates at a frequency in the audible range, so that an audio sound is output from the actuator 165.

As described above, the operation unit 850 mounted on the movable unit 180 is controlled two-dimensionally regarding the rotation angles around the rotation axes 11 and 12 and is also driven to vibrate in the rotation direction 22. Thus, the input and output operation device in this embodiment is usable as a human-machine interface (HMI) usable in various fields.

Now, with reference to FIG. 17, an operation of detecting a signal representing a rotation angle of the movable unit 180, which is output from the actuator 165 to the display computation processing unit 700 via the control computation processing unit 94 will be described.

In the case where the movable unit 180 is rotated two-dimensionally around the rotation axes 11 and 12 via the operation unit 850 by a finger tip, the magnetic sensors 501*a* and 501*b* and the magnetic sensors 503*a* and 503*b* act as sensors detecting the rotation angles of the movable unit 180 around the rotation axes 11 and 12 because of the structure of the actuator 165.

In addition, the actuator 165 has a good frequency response characteristic and a high rotation angle resolution, and therefore has a very high detection sensitivity on the operation of the movable unit 180 moved by a finger. Thus, the actuator 165 may even detect flick input and swipe input, and also character input, often used for mobile terminals.

The rotation angle signal 86*y* corresponding to a rotation in the rotation direction 20, namely, the y-axis direction vertical to the horizontal plane HS in the display computation processing unit 700 is output from the magnetic sensors 501*a* and 501*b*. The rotation angle signal 86*x* corresponding to a rotation in the rotation direction 21, namely, the direction of the horizontal plane HS in the display computation processing unit 700 is output from the magnetic sensors 503*a* and 503*b*.

The rotation angle signals 86*x* and 86*y* have a noise component or a DC drift component removed by the analog circuits 97*x* and 97*y* to become the rotation angle signals 87*x* and 87*y*. The rotation angle signals 87*x* and 87*y* are amplified by the amplification circuits 98*x* and 98*y*. As a result, the rotation angle signals 88*x* and 88*y* having an appropriate output value are obtained. The rotation angle signals 88*x* and 88*y* are digitized by the A/D converters 99*x* and 99*y* into the rotation angle signals 89*x* and 89*y*, which are sequentially input to the control computation processing unit 94. The control computation processing unit 94 has stored thereon various input detection waveform patterns including special input pattern modes such as flick input, swipe input and the like. The control computation processing unit 94 detects, by comparison, the input pattern mode corresponding to each of the input rotation angle signals 89*x* and 89*y*, and performs signal selection. Then, the control computation processing unit 94 outputs the selected signal as a selection signal 82*s* to the display computation processing unit 700.

Now, an operation of detecting the rotation of the movable unit 180 in the rotation direction 22 will be described. In this embodiment, no magnetic sensor dedicated for rotation detection is provided. As described above, when the movable unit 180 is rotated in the rotation direction 22 in addition to in the rotation direction 20 and the rotation direction 21, it is detected, from the output difference between the rotation angle signals 89*x* and 89*y*, whether the movable unit 180 has been operated to rotate rightward or leftward in the rotation direction 22.

This allows the operation unit 850 mounted on the movable unit 180 to be rotated rightward or leftward while being rotated in the rotation direction 20 and the rotation direction 21 at the same time. Therefore, enlargement or contraction of a screen by pinch input or substitute input for scroll input, which is often used for mobile terminals, is made detectable. For example, the control computation processing unit 94 may detect a difference between the rotation angle signals 89*x* and 89*y* and output the result to the display computation processing unit 700 as a detection signal 82*r*.

In the above, the operations of input/output control performed by the display computation processing unit 700, the control computation processing unit 94 and the actuator 165 have been described. As shown in, for example, FIG. 16 and FIG. 17, the display computation processing unit 700 may include an identification coordinate area 710, in which the movable unit 180 of the actuator 165 is movable. With such a structure, the operator is allowed to freely operate the operation unit 850 with no movement load in a range corresponding to the identification coordinate area 710. By contrast, when the operation unit 850 is moved outside the identification coordinate area 710, the operator is allowed to drive the movable unit 180 such that the movable unit 180 returns to a position, on the coordinate axes, inside of the identification coordinate area 710 that is closest to the current position. Namely, the range restriction on the operation unit 850 is made possible, and thus the input and output operation device 750 has a wider variety of functions and is applicable to a wider variety of fields. In this case, the control computation processing unit 94, for example, sets the target position coordinate pair at a center of the identification coordinate area 710. In the case where the current position coordinate pair represented by the rotation angle signals 89x and 89y is inside the identification coordinate area 710, the control computation processing unit 94 sets a first gain as the above-described feedback. In the case where the current position coordinate pair is outside the identification coordinate area 710, the control computation processing unit 94 sets a gain larger than the first gain. With such a structure, in the case where, for example, the operator moves the operation unit 850 with his/her finger, the operator obtains a haptic sense as if there was a restricting wall around the identification coordinate area 710. In addition, control variables including phase compensation, gain correction and the like may be changed, so that it is sensed that the restricting wall is formed of a hard material or a soft material.

The identification coordinate area may be changed instantaneously in a software-like manner, so that the input and output operation device is usable with any of various range restrictions.

Embodiment 2

Figure 18:
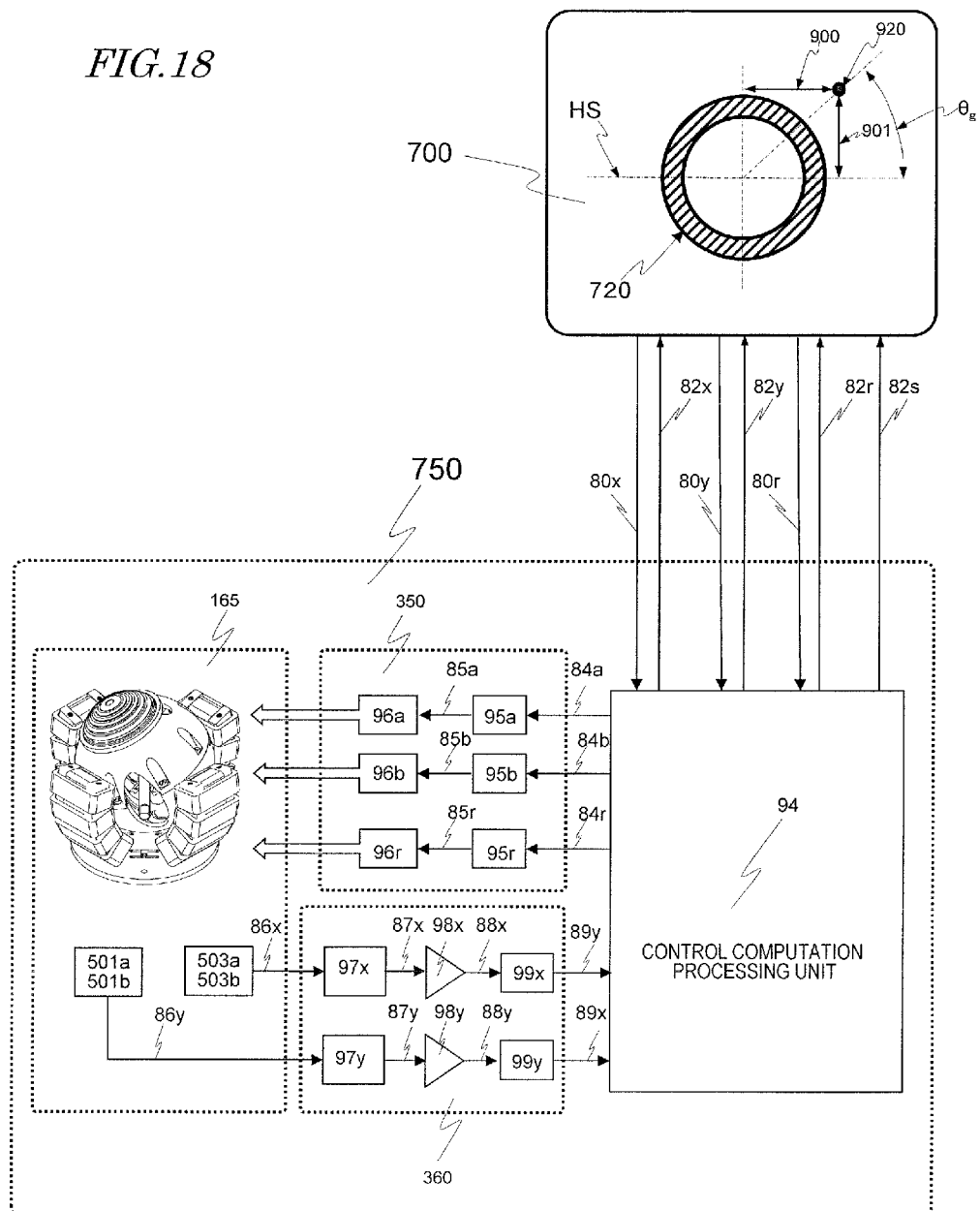
FIG. 18 is a block diagram showing, in detail, a structure of an input and output operation device 750 in embodiment 2 according to the present disclosure.

FIG. 18 is a block diagram showing, in detail, a structure of an input and output operation device 750 in embodiment 2 according to the present disclosure. With reference to FIG. 18, an operation of the input and output operation device 750 including the actuator 165 in embodiment 2 will be described. The structure of the input and output operation device 750 in embodiment 2 is the same as that in embodiment 1 except that an identification coordinate area 720, which is circular ring-shaped, is provided.

Like in embodiment 1, the control computation processing unit 94, for example, sets the target position coordinate pair at a center of the identification coordinate area 720. In the case where the current position coordinate pair represented by the rotation angle signals 89x and 89y is inside the identification coordinate area 720, the control computation processing unit 94 sets a first gain as the above-described feedback. In the case where the current position coordinate pair is outside the identification coordinate area 720, the control computation processing unit 94 sets a gain larger than the first gain. With such a structure, the operator is allowed to freely operate the operation unit 850 with no movement load in a range corresponding to the identification coordinate area 720. By contrast, when the operation unit 850 is moved outside the identification coordinate area 720, the operator is allowed to drive the movable unit 180 such that the movable unit 180 returns to a position, on the coordinate axes, inside of the identification coordinate area 720 that is closest to the current position. Namely, track restriction on the operation unit 850 to a circular range is made possible, and thus the input and output operation device 750 has a wider variety of functions and is applicable to a wider variety fields.

As described above, the input and output operation device 750 in embodiment 2 allows the operator to move his/her finger such that the movement of the finger matches a predetermined target track without visually looking at the operation unit 850. Thus, an operation with a sense of blind touch is realized.

Embodiment 3

Figure 19:
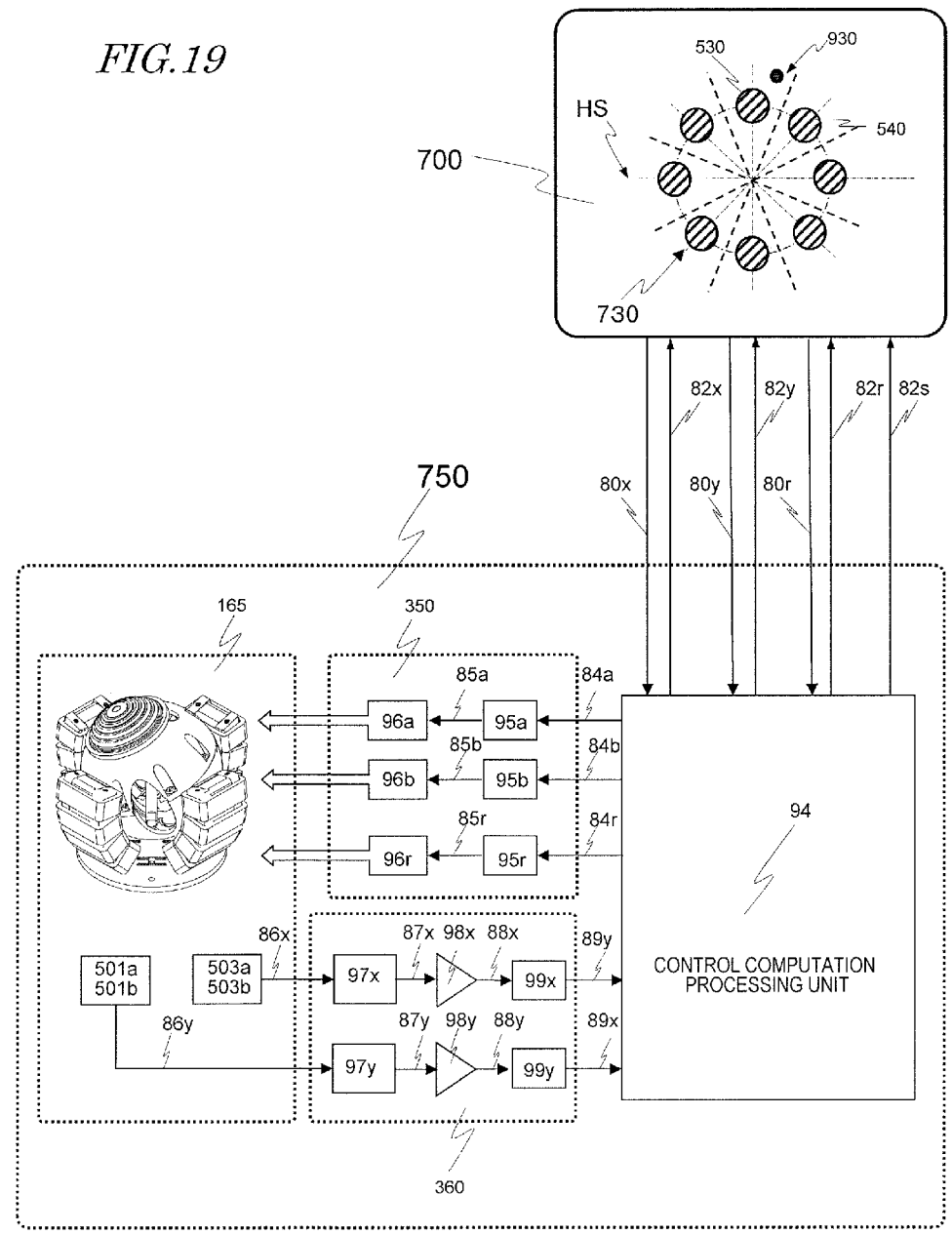
FIG. 19 is a block diagram showing, in detail, a structure of an input and output operation device 750 in embodiment 3 according to the present disclosure.

FIG. 19 is a block diagram showing, in detail, a structure of an input and output operation device 750 in embodiment 3 according to the present disclosure. With reference to FIG. 19, an operation of the input and output operation device 750 including the actuator 165 in embodiment 3 will be described. The structure of the input and output operation device 750 in embodiment 3 is the same as that in embodiment 1 except that an identification coordinate area 730 including a plurality of areas located discretely is provided.

As shown in FIG. 19, the identification coordinate area 730, including the plurality of areas located in a dispersed manner on a circumference, is used as the target. The control computation processing unit 94 sets the target position coordinate pair in one area selected from the plurality of areas in accordance with a current position coordinate pair 930 of the operation unit 850 mounted on the movable unit 180 or an external signal, and performs a feedback control as described in embodiment 1. For example, the control computation processing unit 94 sets fan-shaped areas corresponding to the plurality of areas of the identification coordinate area 730 as represented by the thick dashed lines in FIG. 19. In the case where the current position coordinate pair 930 of the operation unit 850 is inside one of the fan-shaped areas, the control computation processing unit 94 sets the target position coordinate pair at a center of the identification coordinate area in the one fan-shaped area. In the case where, for example, the movable unit 180 is at the current position coordinate pair 930, the identification coordinate area close thereto positionally is an area 530. The control computation processing unit 94 sets the area 530 as an identification coordinate area. The control computation processing unit 94 also sets the target position coordinate pair at a center of the area 530. With such a structure, the operation unit 850 mounted on the movable unit 180 is driven by the feedback control to be located in the area 530.

In the case where, for example, the operation unit 850 located inside an area 540 is forcibly moved by the finger of the operator toward the area 530 outside the area 540 and the current position coordinate pair 930 is moved to the fan-shaped area corresponding to the area 540, the control computation processing unit 94 sets the target portion coordinate pair at a center of the area 540. As a result, the operation unit 850 is moved by the feedback control to the area 540.

As described in embodiment 1, a hard material or a soft material is freely selected as the material of the wall. Therefore, in the case where the operation unit 850 is to be transferred from the area 540 to the area 530, the sense of operation at the time of transfer may be freely changed to sharp click or viscous damping.

In addition, the target position coordinate pair may be determined based on an instruction from the operator. For example, regarding an operation of selecting either the area 530 or the area 540, the operator may rotate the operation unit 850 in the rotation direction 22 after the operation unit 850 reaches either area. Thus, the control computation processing unit 94 outputs the detection signal 82r to make a selection.

As described above, the input and output operation device 750 in embodiment 3 allows the detection signal 82r on a rotation around the rotation axis 22 to be used as a selection switch. Therefore, it is not necessary to separately provide a selection switch.

Embodiment 4

Figure 20:
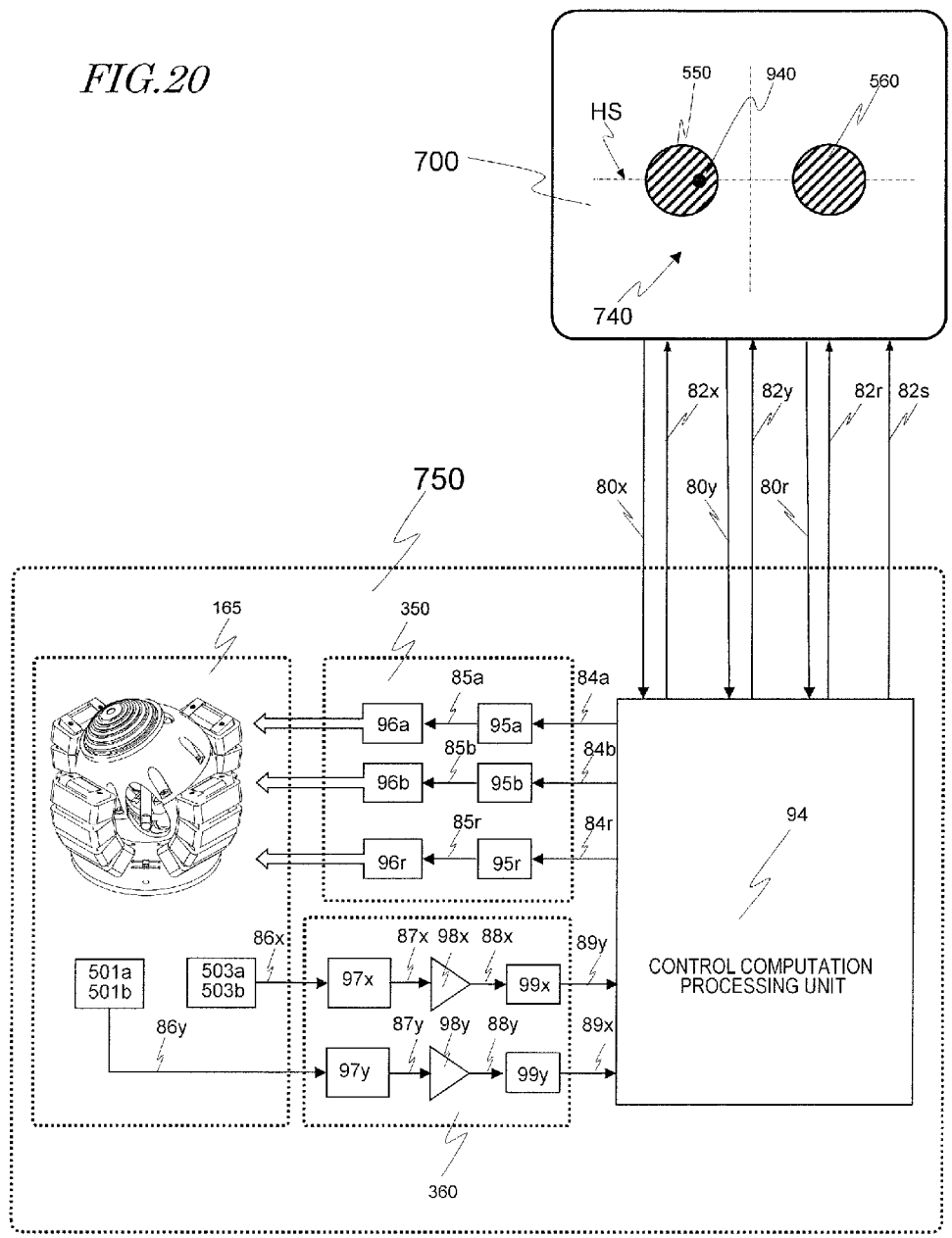
FIG. 20 is a block diagram showing, in detail, a structure of an input and output operation device 750 in embodiment 4 according to the present disclosure.

FIG. 20 is a block diagram showing, in detail, a structure of an input and output operation device 750 in embodiment 4 according to the present disclosure. With reference to FIG. 20, an operation of the input and output operation device 750 including the actuator 165 in embodiment 4 will be described. The structure of the input and output operation device 750 in embodiment 4 is the same as that in embodiment 1 except that an identification coordinate area 740 including a plurality of areas located discretely is provided and that the operation unit 850 is driven to vibrate around the rotation axis 10.

As shown in FIG. 20, the identification coordinate area 740, including two identification coordinate areas, is used as the target. The feedback control of guiding the operation unit 850 to any of the plurality of areas is as described in embodiment 3. In the case where as shown in, for example, FIG. 20, the movable unit 180 is at a current position coordinate pair 940 inside an area 550, an area 560 is a candidate for the identification coordinate area close thereto positionally. In the case where the operation unit 850 located inside the area 550 is forcibly moved, by the finger of the operator, outside the area 550 and reaches the area 560, the control computation processing unit 94 drives the operation unit 850 to vibrate around the rotation axis 10 at the same time as the operation unit 850 reaches the area 560.

This allows the operator to haptically feel that the operation unit 850 has reached the area 560 by the vibration without visually looking at the operation unit 850. The driving signal 84r usable to drive the operation unit 850 to vibrate preferably has a driving frequency of 10 Hz to 220 Hz, which is sensed by the Pacinian corpuscles at the finger tip. An audio signal may be used as the driving signal 84r.

Embodiment 5

Figure 21:
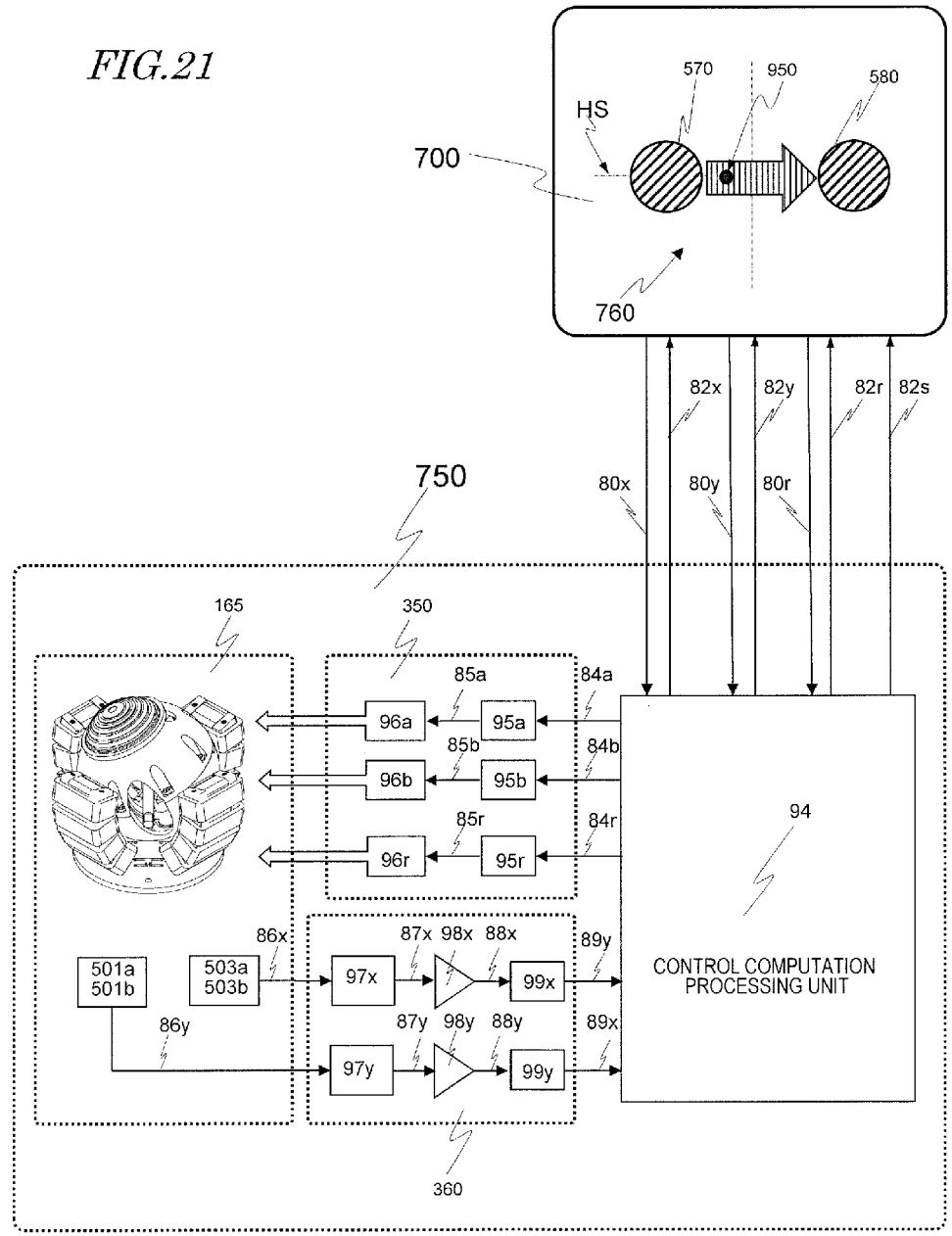
FIG. 21 is a block diagram showing, in detail, a structure of an input and output operation device 750 in embodiment 5 according to the present disclosure.

FIG. 21 is a block diagram showing, in detail, a structure of an input and output operation device 750 in embodiment 5 according to the present disclosure. With reference to FIG. 21, an operation of the input and output operation device 750 including the actuator 165 in embodiment 5 will be described. The structure of the input and output operation device 750 in embodiment 5 is the same as that in embodiment 1 except that an identification coordinate area 760 including a plurality of areas located discretely is provided and that a transfer state 590 in which the operator transfers the operation unit 850 from an area 570 to an area 580 is freely changeable.

As shown in FIG. 21, the identification coordinate area 760 including the areas 570 and 580 is set in the display computation processing unit 700. In the case where as shown in, for example, FIG. 21, the movable unit 180 is at a current position coordinate pair 950, which is in the middle of transfer from the area 570 to the area 580, the identification coordinate area closest thereto positionally is the area 570. The feedback control of guiding the operation unit 850 to the area 570 or 580 is as described above in embodiment 3.

One of two areas, namely, the area 570 and the area 580, is selectable. The current position coordinate pair 950 is closer to the area 570 than to the area 580. Even in the case where the operation unit 850 is at the current position coordinate pair 950, the rotation angle signals 89x and 89y are sequentially input to the control computation processing unit 94. Therefore, the rotation angle signals 89x and 89y may be used to provide a movement-load resistance to the operation unit 850 step by step in accordance with the position coordinate pair in the middle of transfer. For example, in the case where the movement-load resistance is added in a manner of rectangular wave, the finger of the operator feels a tiny click vibration via the operation unit 850. In the case where a load resistance depending on the speed of the operation unit 850 is provided, the finger of the operator feels a sense of damping like a viscous drag. In this case, the operator receives, from the vibration, a haptic sense with a stronger resistance when moving the operation unit 850 from the current position coordinate pair 950 to the area 570 than when moving the operation unit 850 from the current position coordinate pair 950 to the area 580. Therefore, for moving the operation unit 850 from the area 570 to the area 580, the operator operates the operation unit 850 with a natural sense guided by the haptic sense.

Embodiment 6

Figure 22A:
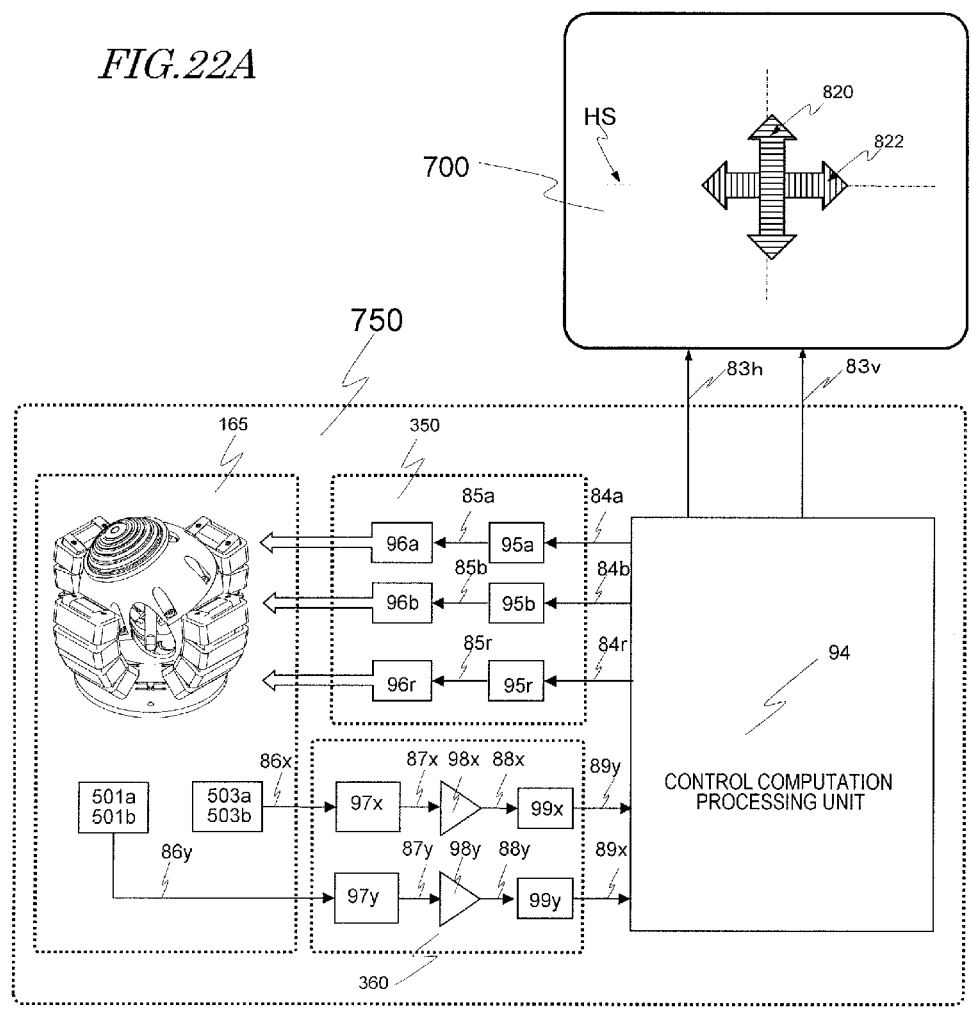
FIG. 22A is a block diagram showing, in detail, a structure of an input and output operation device 750 in embodiment 6 according to the present disclosure.
Figure 22B:
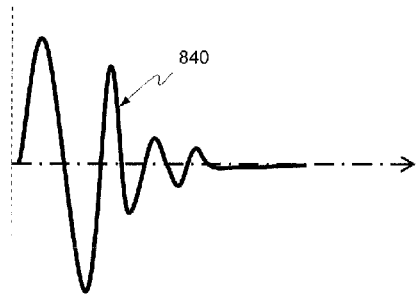
FIG. 22B shows an input detection signal of the input and output operation device 750 in embodiment 6 according to the present disclosure.

FIG. 22A is a block diagram showing, in detail, a structure of an input and output operation device 750 in embodiment 6 according to the present disclosure. FIG. 22B shows an input detection signal of the input and output operation device 750 in embodiment 6 according to the present disclosure. With reference to FIG. 22A and FIG. 22B, an operation of the input and output operation device 750 including the actuator 165 in embodiment 6 will be described.

FIG. 22B shows a transient response signal detected in the rotation angle signals 89x and 89y when the operator performs a flick operation or a swipe operation to the operation unit 850. The structure of the input and output operation device 750 in embodiment 6 is the same as that in embodiment 1 except that the transient response signal pattern is recognized by the control computation processing unit 94.

In general, there are two methods for operating a touch panel usable for a mobile terminal. One is an operation method called "flick", by which the screen is pressed and then flicked with a finger. The other is an operation method called "swipe", by which the screen is pressed and then swiped in a certain direction with a finger. These operation methods are unique to a touch panel. With the flick, it is not necessary to press the same key again and again, and thus the character input speed is improved. With the swipe, screens and pages are switched.

However, it is difficult for an input and output operation device such as a joystick or the like having a mechanical structure to perform an input with a flick operation or a swipe operation due to an insufficient frequency response characteristic and a problem in terms of sensing resolution.

The input and output operation device 750 in this embodiment has a high frequency response characteristic and a high resolution magnetic sensor that solve the above-described problems, and thus properly detects a transient response signal of the operation unit 850 as shown in FIG. 22B. Therefore, the control computation processing unit 94 performs pattern recognition on the rotation angle signals 89x and 89y on the movement of the operation unit 850, and thus detects a flick operation or a swipe operation of the operation unit 850 as an input signal.

This realizes flip and swipe accompanying a realistic operation that is not enjoyed with a touch panel operation. Specifically, the operation unit is allowed to make a flick operation or a swipe operation, so that a two-dimensional operation in display directions 822 and 820 as shown in FIG. 22A is made possible.

The input and output operation device 750 in each of embodiments 1 through 6 includes a position control system mainly using position signals. Alternatively, the rotation angle signals 89x and 89y may be input to the control computation processing unit 94 from the magnetic sensors 501a and 501b and the magnetic sensors 503a and 503b of the actuator 165 via an A/D converter, and subjected to a differential computation process. In this case, a rotation speed signal on the movable unit 180 is detected. With such a structure, the control computation processing unit 94 may also perform a differential computation process on the target position coordinate signals 80x and 80y to further construct a speed feedback system using the rotation speed signals on the movable unit 180. Thus, position control is performed at a higher speed.

Embodiment 7

Figure 23:
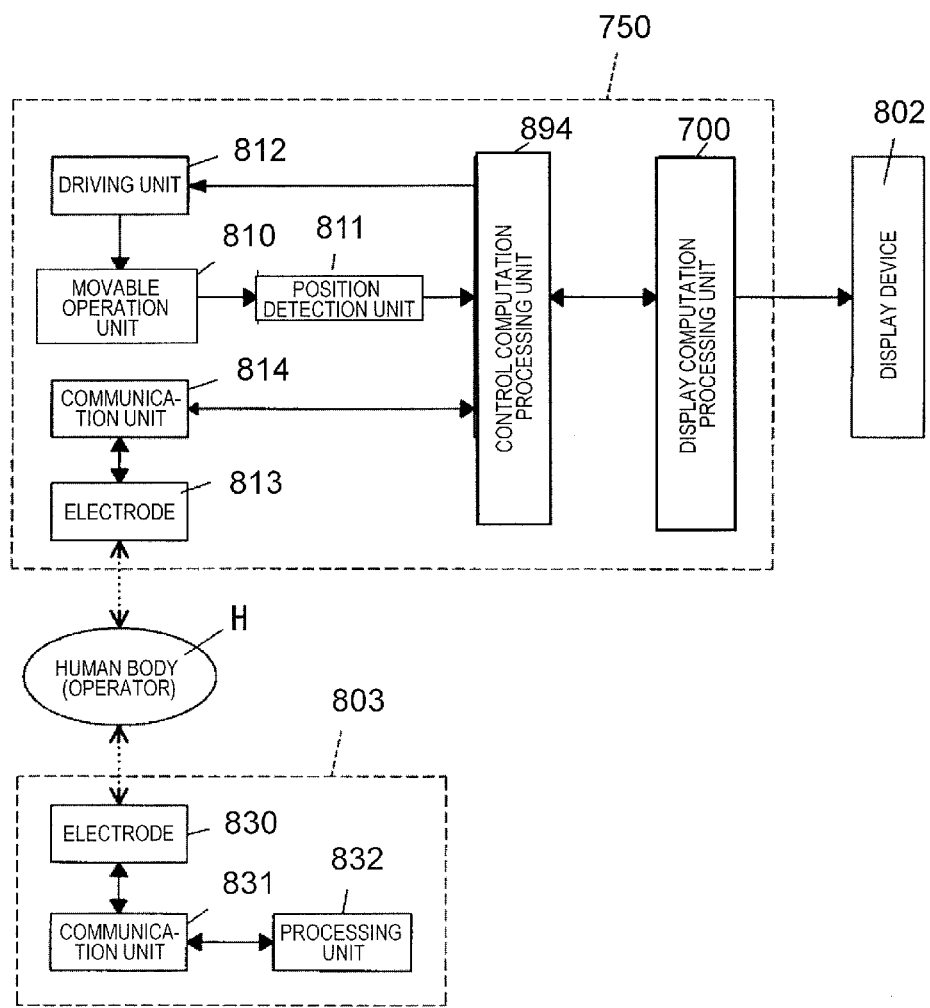
FIG. 23 is a block diagram showing an input and output operation device 750 in embodiment 7 according to the present disclosure.

FIG. 23 is a block diagram showing a structure of an input and output operation device 750 in embodiment 7 according to the present disclosure in detail. As shown in FIG. 23, the input and output operation device 750 includes a movable operation unit 810, a position detection unit 811, a driving unit 812, an electrode 813, a communication unit 814, a control computation processing unit 894, a display computation processing unit 700, and the like.

The electrode 813 includes two flat plate-like conductors (not shown) and a dielectric member (not shown) sandwiched between the two conductors.

The communication unit 814 includes a transmission circuit (not shown) and a receiving circuit (not shown). The transmission circuit includes, for example, a voltage controlled oscillator (VCO), and oscillates an AC signal (high frequency signal) of RF (radio frequency).

The control computation processing unit 894 includes a microcontroller as a main component. The control computation processing unit 894 is configured to, for example, control the transmission circuit of the communication unit 814 such that the communication unit 814 performs an FK (frequency-shift keying) modulation on the high frequency signal (carrier wave) to generate a transfer signal including various types of information (transmission data) and applies the generated transfer signal to the electrode 813. The application of the transfer signal changes an electric field generated around the electrode 813, and the change in the electric field is propagated via the operator (human body H). As a result, the transfer signal is transferred to a communication tag 803 from the communication unit 814.

The receiving circuit of the communication unit 814 is configured to convert a change in the electric field guided to the electrode 813 via the human body H into an electrical signal (transfer signal) and to demodulate the transmission data from the transfer signal and transfer the transmission data to the control computation processing unit 894.

For the movable operation unit 810, the position detection unit 811 and the driving unit 812, the actuator 165 in embodiment 1 described with reference to FIG. 1 and the like is usable. As described in embodiment 1, the movable operation unit 810 includes an operation unit 850 and a movable unit 180 having operation unit 850 mounted thereon. The movable operation unit 810 is freely movable, with respect to a secured unit, in a rotation direction 22 as centered around a Z-axis 10, in a rotation direction 21 as centered around a rotation axis (X-axis) 11 crossing the Z-axis 10 perpendicularly and passing a spherical center 70, and in a rotation direction 20 as centered around a rotation axis (Y-axis) 12 crossing the Z-axis 10 perpendicularly and passing the spherical center 70.

As described in embodiment 1, the driving unit 812 includes a first driving unit and a second driving unit that respectively rotate (incline) the movable operation unit 810 in the rotation direction 20 (as centered around the Y-axis) and in the rotation direction 21 (as centered around the X-axis), and a third driving unit that rotates the operation unit 850, with respect to the secured unit, in the rotation direction 22 (as centered around the Z-axis). The driving unit 812 does not need to include the third driving unit. The first driving unit includes a pair of driving magnets 401, a pair of driving coils 301, and a pair of magnetic yokes 203 formed of a magnetic material. Inside the pair of driving coils 301, a pair of driving coils 303 included in the third driving unit that drives the operation unit 850 to rotate in the rotation direction 22 as centered around the Z-axis 10 are wound. The second driving unit includes a pair of driving magnets 402, a pair of driving coils 302, and a pair of magnetic yokes 204 formed of a magnetic material. Inside the pair of driving coils 302, a pair of driving coils 303 included in the third driving unit that drives the operation unit 850 to rotate in the rotation direction 22 as centered around the Z-axis 10 described below are wound. The driving unit 812 also includes a driving circuit unit. The driving circuit unit receives a target rotation angle signal for the movable operation unit 810 and controls the first and second driving units.

As described in detail in embodiment 1, the position detection unit 811 includes at least a first detection unit that detects rotation angles of the movable unit 180 around the X-axis and the Y-axis. The first detection unit includes a rotation detection magnet 406 mounted on a bottom part of the movable unit 180, a pair of magnetic sensors 501a and 501b that are parallel to a straight line 13 passing the spherical center 70 and crossing the rotation axes 11 and 12 perpendicularly on a plane including the rotation axes 11 and 12 and are located as centered around the Z-axis 10, and a pair of magnetic sensors 503a and 503b that are parallel to a straight line 14 passing the spherical center 70 and crossing the straight line 13 perpendicularly on the plane including the rotation axes 11 and 12 and are located as centered around the Z-axis 10. The position detection unit 811 may also include a second detection unit that detects a rotation angle of the movable unit 180 around the Z-axis.

The position detection unit 811 further includes a detection circuit unit, and the detection circuit unit generates first and second rotation angle signals from first and second angles.

The display computation processing unit 700 includes a microcontroller as a main component. The display computation processing unit 700 executes a process of causing a display device 802 to display information such as an image, a character, an icon, a pointer or the like. The display device 802 includes a liquid crystal display or an organic electroluminescence display (OELD) and a driving circuit, and is configured to display the information on a screen by the display computation processing unit 700 controlling the driving of the driving circuit. The display computation processing unit 700 may include the display device 802.

The control computation processing unit 894 receives the rotation angle signals on the movable unit 180 generated by the position detection unit 811 as position information on the movable operation unit 810. The control computation processing unit 894 performs a reverse conversion computation on the rotation angle signals on the movable unit 180 into signals in a position coordinate system on the display computation processing unit 700, and outputs the resultant signals as feedback position coordinate signals to the display computation processing unit 700.

Figure 24:
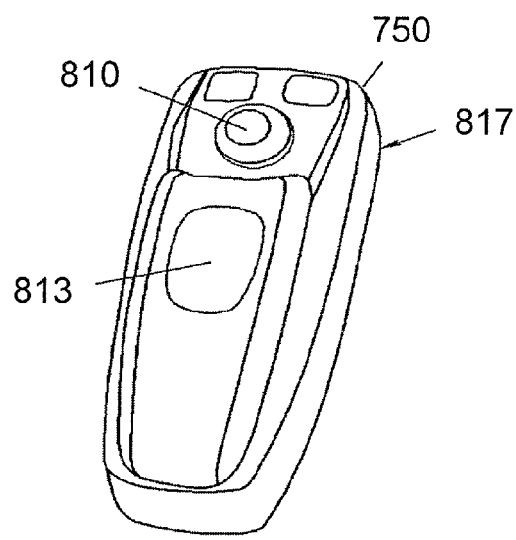
FIG. 24 is an isometric view of the input and output operation device 750 in embodiment 7 according to the present disclosure.

As shown in FIG. 24, the input and output operation device 750 includes a housing 817 formed of a synthetic resin molded body, and the elements 810 through 816 such as the movable operation unit 810 and the like that are accommodated in the housing 817. The housing 817 has a lengthy parallelepiped shape, and a part of the movable operation unit 810 is exposed on a top surface of the housing 817 at one end of a longitudinal direction thereof. Apart of the electrode 813 (a part of one of the conductors) is exposed at a position to the rear of the moving operation unit 810 on the top surface of the housing 817. In the example shown in FIG. 24, the electrode 813 is provided discretely from the movable operation unit 810. Alternatively, the electrode 813 may be provided in the operation unit 850 of the movable operation unit 810.

In the meantime, the communication tag 803 includes the electrode 830, the communication unit 831, the processing unit 832 and the like (see FIG. 23). The electrode 830 includes two flat plate-like conductors (not shown) and a dielectric member sandwiched between the two conductors. The communication unit 831 includes a transmission circuit and a receiving circuit (neither is shown).

The transmission circuit includes, for example, a voltage controlled oscillator and oscillates an AC signal of RF. The processing unit 832 includes a microcontroller as a main component. The processing unit 832 is configured to control the transmission circuit such that the transmission circuit performs an FK modulation on the high frequency signal (carrier wave) to generate a transfer signal including various types of information (e.g., unique identification code <ID information>) and applies the generated transfer signal to the electrode 830. The application of the transfer signal changes an electric field generated around the electrode 830, and the change in the electric field is propagated via the operator (human body H). As a result, the transfer signal is transferred to the input and output operation device 750 from the communication tag 803.

The receiving circuit is configured to convert a change in the electric field guided to the electrode 830 via the human body H into an electrical signal (transfer signal) and demodulate transmission data from the transfer signal and transfer the transmission data to the processing unit 832. The communication tag 803 includes a battery, and the battery provides an operation power source to the units 831 and 832.

Figure 25:
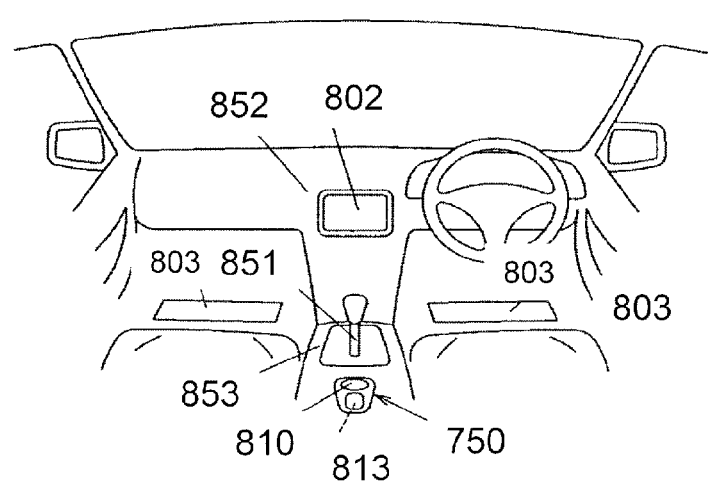
FIG. 25 is a partially omitted isometric view showing the inside of a vehicle in which the input and output operation device 750 in embodiment 7 according to the present disclosure is installed.

The input and output operation device 750 in this embodiment is usable to, for example, operate a vehicle-mountable device (car navigation device, audio device, etc.). As shown in FIG. 25, the input and output operation device 750 is located, for example, to the rear of a shift lever 851 in a center console 853 of the vehicle. The display device 802 is located at a center of a dashboard (also referred to as an "instrument panel") 852 of the vehicle. The display computation processing unit 700 is located inside a main body of the input and output operation device 750 shown in FIG. 24. Alternatively, the display computation processing unit 700 may be provided outside the main body of the input and output operation device 750, for example, inside the dashboard. At the foot of a driver's seat, at the foot of a passenger seat, and the foot of a rear seat, the communication tags 803 are respectively provided. The communication tags 803 are each incorporated into a floor mat placed at the foot of each seat such that the footwear of the person sitting on the respective seat (driver or passenger) contacts the electrode 830. The communication tags 803 are each assigned a unique identification code, and a transmission signal including the identification code is transferred from each communication tag 803 to the communication unit 814 of the input and output operation device 750 via the human body. The communication tags 803 may each be provided in a sitting portion or a backrest of each seat.

Now, an operation of the input and output operation device 750 in this embodiment will be described.

First, it is assumed that a driver and a passenger respectively sit on the driver's seat and the passenger's seat of the vehicle, and the person sitting on the driver's seat (driver) puts his/her left hand on the input and output operation device 750 (on the top surface of the housing 817) and operates the movable operation unit 810 with a finger. In the state where the driver's hand is in contact with the electrode 813, the control computation processing unit 894 of the input and output operation device 750 generates a message inquiring an identification code and transmits a transfer signal including the message from the communication unit 814.

The transfer signal reaches the electrode 830 of the communication tag 803 from the electrode 813 via the driver, and is received by the communication unit 831. Upon acquisition of the inquiring message included in the transfer signal received by the communication unit 831, the processing unit 832 of the communication tag 803 reads an identification code stored on a memory (not shown) and causes the communication unit 831 to transmit a transfer signal including the identification code.

The communication unit 814 of the input and output operation device 750 receives the transfer signal transmitted from the communication tag 803. The control computation processing unit 894 checks the identification code included in the transfer signal received by the communication unit 814 against identification codes registered on a memory (not shown) in advance to determine whether the operator of the input and output operation device 750 is the driver or the passenger (attribute of the operator) and recognizes the attribute of the operator (driver).

The control computation processing unit 894 has information on the vehicle speed acquired from an electronic control unit of the vehicle, and is configured to determine whether the vehicle speed is zero (when the vehicle is at a stop) or is not zero (when the vehicle is running) and change a pointer operation pattern based on the determination result.

Figure 26:
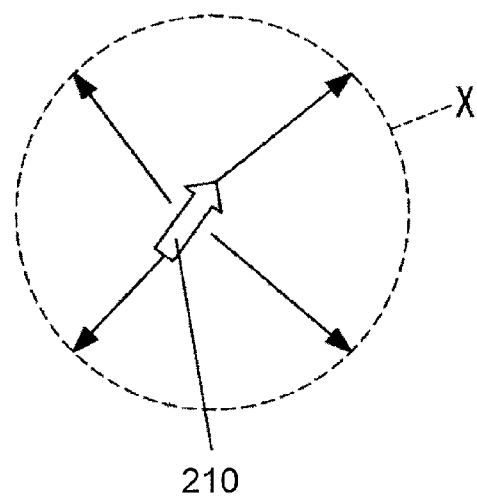
FIG. 26 shows a pointer operation pattern in the input and output operation device 750 in embodiment 7 according to the present disclosure.

The "pointer operation pattern" is a range in which the pointer is permitted to be operated on the screen of the display device 802. For example, a first pointer operation pattern is, as shown in FIG. 26, an area enclosed by one border line (circle represented by the dashed line X) on the screen of the display device 802. While the first pointer operation pattern is selected, the operation range of a pointer 210 is restricted to the area inside the border line. The borderline is not limited to being circular and may be elliptic, polygonal or the like.

Figure 27:
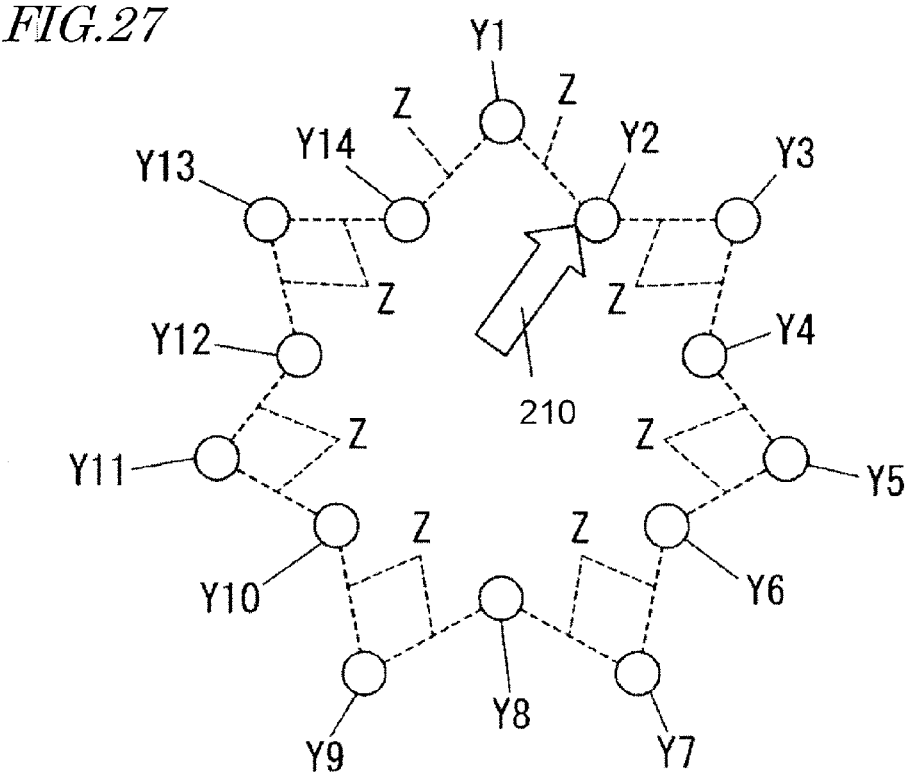
FIG. 27 shows a pointer operation pattern in the input and output operation device 750 in embodiment 7 according to the present disclosure.

A second pointer operation pattern includes, as shown in FIG. 27, a plurality of (in the example shown in the figure, 14) areas Y1 through Y14 fixed on the screen of the display device 802 and a track (straight line) Z connecting adjacent areas among the areas Y1 through Y14. While the second pointer operation pattern is selected, the operation range of the pointer 210 is restricted to an area inside the 14 areas Y1 through Y14 and on the track Z connecting the areas Y1 through Y14. For example, when the pointer 210 is to move from the area Y1 to the area Y8, the pointer 210 needs to be moved on the track Z sequentially from the area Y1 to the area Y2 and from the area Y2 to the area Y3.

Figure 28:
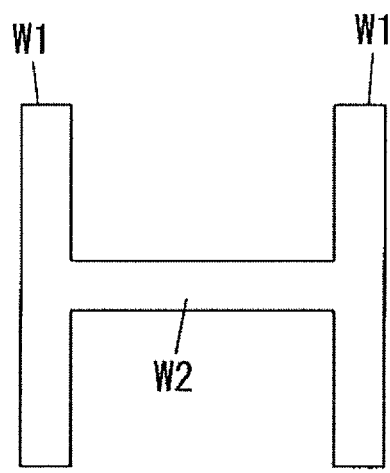
FIG. 28 shows a pointer operation pattern in the input and output operation device 750 in embodiment 7 according to the present disclosure.
Figure 29:
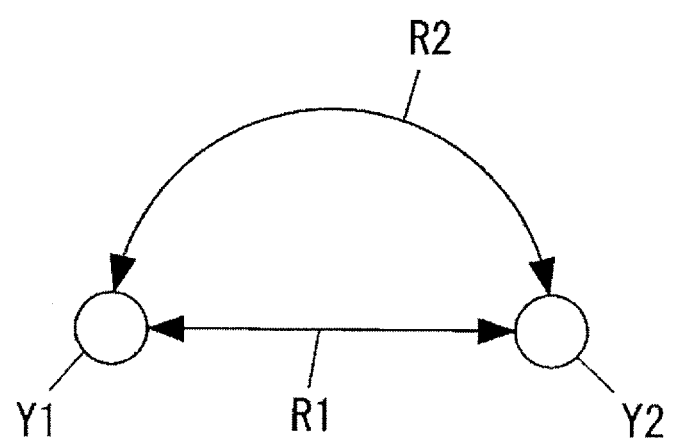
FIG. 29 shows a pointer operation pattern in the input and output operation device 750 in embodiment 7 according to the present disclosure.

A third pointer operation pattern is, as shown in FIG. 28, in the shape of "H" including two line segments W1 parallel to each other on the screen of the display device 802 and a line segment W2 connecting central points of the line segments W1 to each other. With a fourth pointer operation pattern, as shown in FIG. 29, the route moving two areas Y1 and Y2 is limited to a straight route R1. Namely, any route other than the straight route R1, for example, a semi-arcked route R2 is not used to move the pointer 210. The pointer operation pattern is not limited to any of the above.

For example, in the case where the operator is the driver, when the vehicle speed is zero, the control computation processing unit 894 does not restrict the operation range of the pointer 210 and allows the pointer 210 to freely move in accordance with the position information on the movable operation unit 810. By contrast, in the case where the operator is the driver, when the vehicle speed is not zero, the control computation processing unit 894 selects one of the first through fourth pointer operation patterns and restricts the operation range of the pointer 210 in accordance with the position information on the movable operation unit 810.

Namely, while the driver operates the operation unit 810, it is preferable that the operation range of the pointer 210 is restricted to operation items such as volume adjustment of a navigation sound or the like, so that the driver does not need to look at the screen of the display device 802 carefully. When receiving position information on the movable operation unit 810 that may cause the pointer 210 to be diverted from the pointer operation pattern, the control computation processing unit 894 instructs the driving unit 812 such that the driving unit 812 causes a force contrary to the operation force applied by the operator (reaction force) to act on the movable operation unit 810. In this manner, the control computation processing unit 894 controls the driving unit 812 to cause the reaction force to act on the movable operation unit 810. Therefore, the operator recognizes that he/she made an operation that is not permitted.

In the case where a passenger (e.g., person sitting on the passenger's seat) operates the movable operation unit 810 of the input and output operation device 750, the control computation processing unit 894 determines that the attribute of the operator is a passenger based on the identification information acquired via human body communication from the communication tag 803 installed at the foot of the passenger's seat. In this case, the control computation processing unit 894 does not restrict the operation range of the pointer 210 regardless of the vehicle speed. Therefore, the operator (passenger) is allowed to operate the movable operation unit 810 to freely move the pointer 210 with no restriction.

As described above, the input and output operation device 750 in this embodiment includes the movable operation unit 810, the position of which is changed in accordance with the operation force applied by the operator, the position detection unit 811 that detects the position of the movable operation unit 810, and the driving unit 812 that causes a force contrary to the operation force to act on the movable operation unit 810. The input and output operation device 750 also includes the electrode 813 contactable with the operator, the communication unit 814 that makes a communication via the operator in contact with the electrode 813, and the control computation processing unit 894 that controls the driving unit 812, inputs position information on the movable operation unit 810 detected by the position detection unit 811 and thus executes a process corresponding to the position information.

The control computation processing unit 894 specifies the attribute of the operator from the information received by the communication unit 814, and selects at least one of the plurality of types of pointer operation patterns prepared in advance, in accordance with the attribute.

The control computation processing unit 894 also outputs the selected operation pattern and the position information on the movable operation unit 810 to the display computation processing unit 700. The display computation processing unit 700 executes a process of causing the display device 802 to provide display in accordance with the selected pointer operation pattern and the position information on the movable operation unit 810. The position information on the movable operation unit 810 that is output by the control computation processing unit 894 to the display computation processing unit 700 is, for example, a feedback position coordinate signal obtained as a result of performing a reverse conversion computation on the rotation angle signals on the movable unit 180 into signals in the position coordinate system of the display computation processing unit 700.

The control computation processing unit 894 is configured to cause a force contrary to the operation force to act on the movable operation unit 810 by the driving unit 812 in accordance with the selected pointer operation pattern. The reaction force is controlled to act on the movable operation unit 810 by the driving unit 812 as follows, for example. The display computation processing unit 700 generates a target position coordinate signal for the movable operation unit 810 in accordance with the pointer operation pattern selected by the control computation processing unit 894. The control computation processing unit 894 generates a target rotation angle signal for the movable operation unit 810 based on the target position signal received from the display computation processing unit 700 corresponding to the selected pointer operation pattern and the rotation angle signal received from the position detection unit 811. The driving unit 812 receives the target rotation angle signal from the control computation processing unit 894 and controls the first and second driving units to cause the reaction force to act on the movable operation unit 810.

With the above-described structure, an appropriate pointer operation pattern is selected in accordance with the attribute of the operator (e.g., driver or passenger). Therefore, the input and output operation device 750 is made easier to use. In addition, the input and output operation device 750 determines the attribute of the operator based on the identification information acquired via the human body communication with the communication tag 803. Therefore, the operator does not need to make a switch operation intentionally and thus the ease of use is suppressed from being declined.

In the input and output operation device 750 in this embodiment, the electrode 813 is located at a position at which the electrode 813 is allowed to contact the finger of the operator operating the movable operation unit 810, namely, a position to the rear of the movable operation unit 810 on the top surface of the housing 817. Therefore, when the operator attempts to operate the movable operation unit 810 with his/her finger tip, his/her hand is naturally put on the position to the rear of the movable operation unit 810. Therefore, the attribute of the operator is easily determined without the operator operating a switch or the like intentionally.

Figure 30:
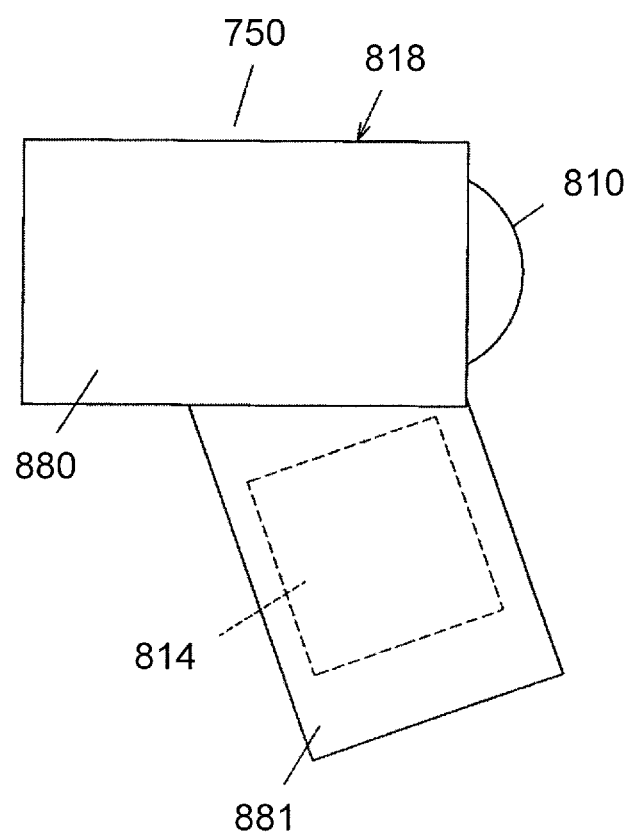
FIG. 30 is a view of an input and output operation device 750 in another form in embodiment 7 according to the present disclosure.

As shown in FIG. 30, the input and output operation device 750 in this embodiment may include a gun-type housing 818 accommodating the movable operation unit 810 and the like. The housing 818 causes a part of the movable operation unit 810 to be exposed from a rear end surface of a portion 880 corresponding to the barrel of the gun, and has the communication unit 814 and the electrode 813 accommodated in a portion 881 corresponding to the grip. The electrode 813 is preferably provided to cover the portion 881 corresponding to the grip in the entire circumference thereof.

The gun-type input and output operation device 750 like this is usable to operate various devices including an elevation device and the like.

In this embodiment, the driving unit is configured to cause a magnetic force to act on a magnetic member integrally provided with the operation unit. The driving unit may be in any form that is configured to be controlled by so-called haptic control. For example, a driving unit that acquires a force contrary to the operation force by the driving of the actuator may be used.

In this embodiment, the communication tags 803 are installed at the foot of the seats in the vehicle. Alternatively, for example, the driver or the passenger may carry the communication tag 803, or the communication tag 803 may be built in the steering wheel.

INDUSTRIAL APPLICABILITY

An input and output operation device disclosed by this application is preferably usable as a human-machine interface (HMI) used in various fields; for example, as an input and output operation device that operates a navigation device, an air conditioner, an audio device, a ratio or the like in a vehicle.

REFERENCE SIGNS LIST

10 Z-axis
11, 12 Rotation axis
13, 14 Straight line
20, 21, 22 Rotation direction
94 Control computation processing unit
70 Spherical center
850 Operation unit
180 Movable unit
102W Opening
102R Convexed spherical surface
165 Actuator
200 Base
200A Convexed spherical surface
200P, 200T Opening
201 Fall-preventive member
201A Fall-preventive restriction surface
203, 204 Magnetic yoke
301, 302, 303 Driving coil
350 Driving circuit unit
360 Detection circuit unit
401, 402 Driving magnet
406 Rotation detection magnet
501a, 501b, 503a, 503b Magnetic sensor
600 Coil spring
650 Coupling rod
670 Magnetic back yoke
700 Display computation processing unit
750 Input and output operation device
802 Display device
803 Communication tag
810 Movable operation unit
811 Position detection unit
812 Driving unit
813 Electrode
814 Communication unit
817 Housing
818 Housing
830 Electrode
831 Communication unit
832 Processing unit
850 Movable unit
853 Center console
851 Shift lever
894 Control computation processing unit

The invention claimed is:

1. An input and output operation device, comprising:
(i) an actuator including:
an operation unit having an operation surface;
a movable unit having the operation unit and at least one attraction magnet mounted thereon and including a concaved portion in a part thereof;
a secured unit including at least one magnetic member and a convexed spherical surface loosely engageable with the concaved portion of the movable unit, the convexed spherical surface being in point-contact or line-contact with the concaved portion of the movable unit by a magnetic attraction force between the at least one attraction magnet and the at least one magnetic member, the secured unit supporting the movable unit such that the movable unit is freely rotatable as centered around a spherical center of the convexed spherical surface;
a first driving unit rotating the operation unit, with respect to the secured unit, as centered around an X-axis passing the spherical center;
a second driving unit rotating the operation unit, with respect to the secured unit, as centered around a Y-axis perpendicular to the X-axis on a plane including the X-axis; and
a detector detecting a first rotation angle of the operation unit, with respect to the secured unit, around the X-axis and a second rotation angle of the operation unit, with respect to the secured unit, around the Y-axis;
wherein the spherical center of the convexed spherical surface is provided at an origin of the X-axis and the Y-axis; and
(ii) a detection circuit unit generating first and second rotation angle signals from the first and second rotation angles.

2. The input and output operation device according to claim 1, further comprising:
a control computation processing unit generating first and second target rotation angle signals based on the first and second rotation angle signals; and
a driving circuit unit receiving the first and second target rotation angle signals and generating a signal usable to drive the first and second driving units.

3. The input and output operation device according to claim 2, wherein the control computation processing unit generates a current position coordinate pair of the operation unit in a two-dimensional coordinate system corresponding to a movable range of the operation unit based on the first and second rotation angle signals, and generates the first and second target rotation angle signals based on a position feedback control performed by use of a difference between a target position coordinate pair and the current position coordinate pair.

4. The input and output operation device according to claim 3, wherein the control computation processing unit sets, in the two-dimensional coordinate system, an identification coordinate area including the target position coordinate pair and being usable as a target; and in the case where the current position coordinate pair of the operation unit is inside the identification coordinate area, sets a first gain of the position feedback control, whereas in the case where the current position coordinate pair of the operation unit is outside the identification coordinate area, sets a gain larger than the first gain.

5. The input and output operation device according to claim 4, wherein the control computation processing unit:
   sets a plurality of identification coordinate areas to be targets in the two-dimensional coordinate system;
   sets the target position coordinate pair in one identification coordinate area selected from the plurality of identification coordinate areas in accordance with the current position coordinate pair of the operation unit or an external signal; and
   in the case where the current position coordinate pair of the operation unit is inside the identification coordinate area, sets the first gain of the position feedback control, whereas in the case where the current position coordinate pair of the operation unit is outside the identification coordinate area, sets a gain large than the first gain.

6. The input and output operation device according to claim 3, wherein the actuator includes a third driving unit rotating the movable unit, with respect to the secured unit, as centered around a Z-axis perpendicular to the X-axis and the Y-axis, the Z-axis being a central axis of the operation unit, the spherical center of the convexed spherical surface is provided at an origin of the X-axis, the Y-axis and the Z-axis.

7. The input and output operation device according to claim 6, wherein:
   the control computation processing unit generates a driving signal having a predetermined driving waveform pattern;
   the driving circuit unit receives the driving signal and generates a signal usable to drive the third driving unit; and
   the movable unit is driven to vibrate around the Z-axis by the third driving unit.

8. The input and output operation device according to claim 7, wherein the predetermined driving waveform pattern includes a vibration waveform having a frequency component in an audible range.

9. The input and output operation device according to claim 6, wherein the detector includes:
   a first detection unit detecting the rotation angles of the operation unit, with respect to the secured unit, around the X-axis and the Y-axis; and
   a second detection unit detecting a rotation angle of the operation unit, with respect to the secured unit, around the Z-axis.

10. The input and output operation device according to claim 6, wherein:
    the first driving unit includes:
      a pair of first driving magnets located in the movable unit symmetrically with respect to the Z-axis;
      a pair of first magnetic yokes located in the secured unit so as to respectively face the pair of first driving magnets; and
      a pair of first driving coils respectively wound around the pair of first magnetic yokes;
    the second driving unit includes:
      a pair of second driving magnets located in the movable unit symmetrically with respect to the Z-axis;
      a pair of second magnetic yokes located in the secured unit so as to respectively face the pair of second driving magnets; and
      a pair of second driving coils respectively wound around the pair of second magnetic yokes;
    the pair of first driving magnets and the pair of first driving coils are located on a straight line passing the spherical center of the convexed spherical surface;
    the pair of second driving magnets and the pair of second driving coils are located on another straight line passing the spherical center of the convexed spherical surface and crossing the straight line perpendicularly; and
    a center between the first driving magnets, a center between the first driving coils, a center between the second driving magnets, and a center between the second driving coils in the Z-axis direction substantially match the spherical center of the convexed spherical surface positionally.

11. The input and output operation device according to claim 10, wherein:
    the third driving unit includes third driving coils respectively wound around the pair of first magnetic yokes and the pair of second magnetic yokes; and
    the pair of first driving magnets and the pair of second driving magnets are used as third driving magnets.

12. The input and output operation device according to claim 10, wherein the pair of first driving magnets and the pair of second driving magnets are respectively coupled together by a pair of magnetic back yokes, and the pair of magnetic back yokes are provided on the side of the spherical center with respect to the movable unit.

13. The input and output operation device according to claim 10, wherein the at least one magnetic member includes the pair of first magnetic yokes and the pair of second magnetic yokes.

14. The input and output operation device according to claim 1, further comprising:
    an electrode contactable with the operator; and
    a communication unit performing a communication via the operator in contact with the electrode;
    wherein the control computation processing unit determines an attribute of the operator based on information received by the communication unit.

15. The input and output operation device according to claim 14, comprising a movable operation unit including the operation unit and the movable unit;
    wherein the control computation processing unit:
      selects at least one of a plurality of types of pointer operation patterns prepared in advance, in accordance with the determined attribute of the operator; and
      causes a force contrary to an operation force to act on the movable unit operation unit by the first and second driving unit, in accordance with the selected pointer operation pattern.

16. The input and output operation device according to claim 15, wherein the pointer operation pattern restricts an operation range of a pointer such that the pointer does not go outside an area enclosed by a preset borderline.

17. The input and output operation device according to claim 15, wherein the pointer operation pattern restricts an operation range of a pointer such that the pointer is not diverted from a preset track.

18. The input and output operation device according to claim 15, wherein the pointer operation pattern restricts an operation range of a pointer such that the pointer is not diverted from an area formed of a plurality of secured areas and a track connecting the plurality of areas.

19. The input and output operation device according to claim 14, wherein the electrode is located at a position that allows the electrode to contact the finger of the operator operating the operation unit.

20. The input and output operation device according to claim 14, wherein:
   the operator is in contact with an electrode of a communication tag; and
   the communication unit communicates with the communication tag via the operator to receive information held by the communication tag.

* * * * *